US011060628B2

(12) United States Patent
Pfund et al.

(10) Patent No.: US 11,060,628 B2
(45) Date of Patent: Jul. 13, 2021

(54) HOUSING FOR MULTIPLE MIXING VALVES

(71) Applicant: Bradley Fixtures Corporation, Menomonee Falls, WI (US)

(72) Inventors: Ryan Pfund, Slinger, WI (US); Heming Dai, Menomonee Falls, WI (US)

(73) Assignee: Bradley Fixtures Corporation, Menomonee Falls, WI (US)

( * ) Notice: Subject to any disclaimer, the term of this patent is extended or adjusted under 35 U.S.C. 154(b) by 82 days.

(21) Appl. No.: 16/413,443

(22) Filed: May 15, 2019

(65) Prior Publication Data

US 2019/0353267 A1 Nov. 21, 2019

Related U.S. Application Data

(60) Provisional application No. 62/672,218, filed on May 16, 2018.

(51) Int. Cl.
*F16K 27/02* (2006.01)
*F16K 11/22* (2006.01)

(52) U.S. Cl.
CPC .......... *F16K 27/0263* (2013.01); *F16K 11/22* (2013.01)

(58) Field of Classification Search
USPC ........................................................ 137/801
See application file for complete search history.

(56) References Cited

U.S. PATENT DOCUMENTS

| | | |
|---|---|---|
| 2,250,815 A | 7/1941 | Ruegg et al. |
| 2,317,717 A | 4/1943 | Bauman |
| 2,506,700 A | 5/1950 | Chace |
| 4,409,694 A | 10/1983 | Barrett et al. |
| 4,635,844 A | 1/1987 | Barrett et al. |
| 4,669,653 A | 6/1987 | Avelov |
| 4,688,273 A | 8/1987 | Lyng |
| 4,699,653 A | 10/1987 | Barcza et al. |
| 4,700,884 A | 10/1987 | Barrett et al. |
| 4,753,265 A | 6/1988 | Barrett et al. |
| 4,896,658 A | 1/1990 | Yonekubo et al. |
| 4,909,435 A | 3/1990 | Kidouchi et al. |

(Continued)

FOREIGN PATENT DOCUMENTS

| | | |
|---|---|---|
| CN | 207516351 U | 6/2018 |
| GB | 2 423 347 | 8/2006 |

OTHER PUBLICATIONS

International Search Report and Written Opinion Application No. PCT/US2019/032516, dated Aug. 8, 2019, 13 pps.

(Continued)

*Primary Examiner* — Daphne M Barry
(74) *Attorney, Agent, or Firm* — Foley & Lardner LLP

(57) ABSTRACT

A valve assembly includes a first mixing valve configured to mix hot fluid and cold fluid to provide a first mixed fluid, a second mixing valve configured to mix hot fluid and cold fluid to provide a second mixed fluid, and a housing configured to receive the first mixing valve and the second mixing valve. The housing defines a hot fluid inlet configured to be fluidly coupled to a supply of hot fluid, a cold fluid inlet configured to be fluidly coupled to a supply of cold fluid, a hot fluid passage fluidly coupling the hot fluid inlet to the first mixing valve and the second mixing valve, and a cold fluid passage fluidly coupling the cold fluid inlet to the first mixing valve and the second mixing valve.

15 Claims, 24 Drawing Sheets

(56) References Cited

U.S. PATENT DOCUMENTS

| | | | |
|---|---|---|---|
| 5,323,960 | A | 6/1994 | Kline |
| 5,647,531 | A | 7/1997 | Kline et al. |
| 5,725,010 | A | 3/1998 | Marty et al. |
| 5,730,167 | A | 3/1998 | Enoki et al. |
| 6,021,952 | A | 2/2000 | Antoniello et al. |
| 6,042,015 | A | 3/2000 | Eveleigh et al. |
| 6,315,210 | B1 | 11/2001 | Kline |
| 6,385,794 | B1 | 5/2002 | Miedzius et al. |
| 6,508,406 | B1 | 1/2003 | Eveleigh et al. |
| 6,543,478 | B2 | 4/2003 | Kline |
| 6,644,333 | B2 | 11/2003 | Gloodt |
| D494,252 | S | 8/2004 | Kline |
| 6,851,440 | B2 | 2/2005 | Kline |
| 6,926,205 | B2 | 8/2005 | Taylor et al. |
| 6,929,188 | B2 | 8/2005 | Taylor et al. |
| 7,163,157 | B2 | 1/2007 | Gonecze et al. |
| 7,175,100 | B2 | 2/2007 | Eveleigh et al. |
| 7,191,954 | B2 | 3/2007 | Kline |
| 7,343,930 | B2 | 3/2008 | Rosko |
| 7,344,088 | B2 | 3/2008 | Yang |
| D577,103 | S | 9/2008 | Caron et al. |
| D585,959 | S | 2/2009 | Caron et al. |
| 7,665,671 | B2 | 2/2010 | Cunningham et al. |
| 7,717,351 | B2 | 5/2010 | Kline |
| D622,350 | S | 8/2010 | Gramegna et al. |
| 7,775,450 | B2 | 8/2010 | Warshawsky |
| 7,896,029 | B2 | 3/2011 | Yoshimura et al. |
| 8,347,917 | B2 | 1/2013 | Yoshimura et al. |
| 8,579,206 | B2 | 11/2013 | Kline |
| 9,165,880 | B2 | 10/2015 | Wang et al. |
| 9,218,006 | B2 | 12/2015 | Kline |
| 9,235,220 | B2 | 1/2016 | Goncze |
| 9,382,833 | B2 | 7/2016 | Morein |
| D762,818 | S | 8/2016 | Kline |
| D771,223 | S | 11/2016 | Rycroft |
| 9,500,299 | B2 | 11/2016 | Morein et al. |
| 9,504,970 | B2 | 11/2016 | Baker |
| 9,599,239 | B2 | 3/2017 | Ohno et al. |
| D794,165 | S | 8/2017 | Adey et al. |
| 9,889,067 | B2 | 2/2018 | Novak et al. |
| 9,898,017 | B2 | 2/2018 | Graves et al. |
| 10,316,977 | B2 | 6/2019 | Raftis et al. |
| 10,557,771 | B2 | 2/2020 | Chang et al. |
| 2004/0173688 | A1 | 9/2004 | Gloodt |
| 2007/0246549 | A1 | 10/2007 | Kline |
| 2009/0014434 | A1 | 1/2009 | Gloodt |
| 2014/0048142 | A1 | 2/2014 | Gloodt |
| 2014/0290775 | A1 | 10/2014 | Lefeber et al. |
| 2016/0040585 | A1 | 2/2016 | Schaefer |
| 2016/0341325 | A1 | 11/2016 | Ye et al. |

OTHER PUBLICATIONS

Kohler K-669-KSNA MasterShower Thermostatic Valve, posted at amazon.com, posting date Jun. 16, 2007, Available from Internet, URL: https://www.amazon.com/Kohler-Model 669KS-Mastershower-Thermostatic/dp/B000ND5WCU, (Year: 2007), 5 pps.

Kohler K-670-KSNA MasterShower Thermostatic Valve, posted at amazon.com, posting date Apr. 2, 2007, Available from Internet, URL: https://www.amazon.com/Kohler-K-670-KS-NA-Mastershower-4-Inch Thermostatic/dp/B000ND7VJ2, (Year: 2007), 6 pps.

Kohler MasterShower Thermostatic Valve, posted at homedepot.com, posting date not given, Available from Internet, URL: https://www.homedepot.com/p/KOHLER-MasterShower-1-2-in-Thermostatic-Valve-K-2972-KS-NA/203782806, (Year: 2019), 4 pps.

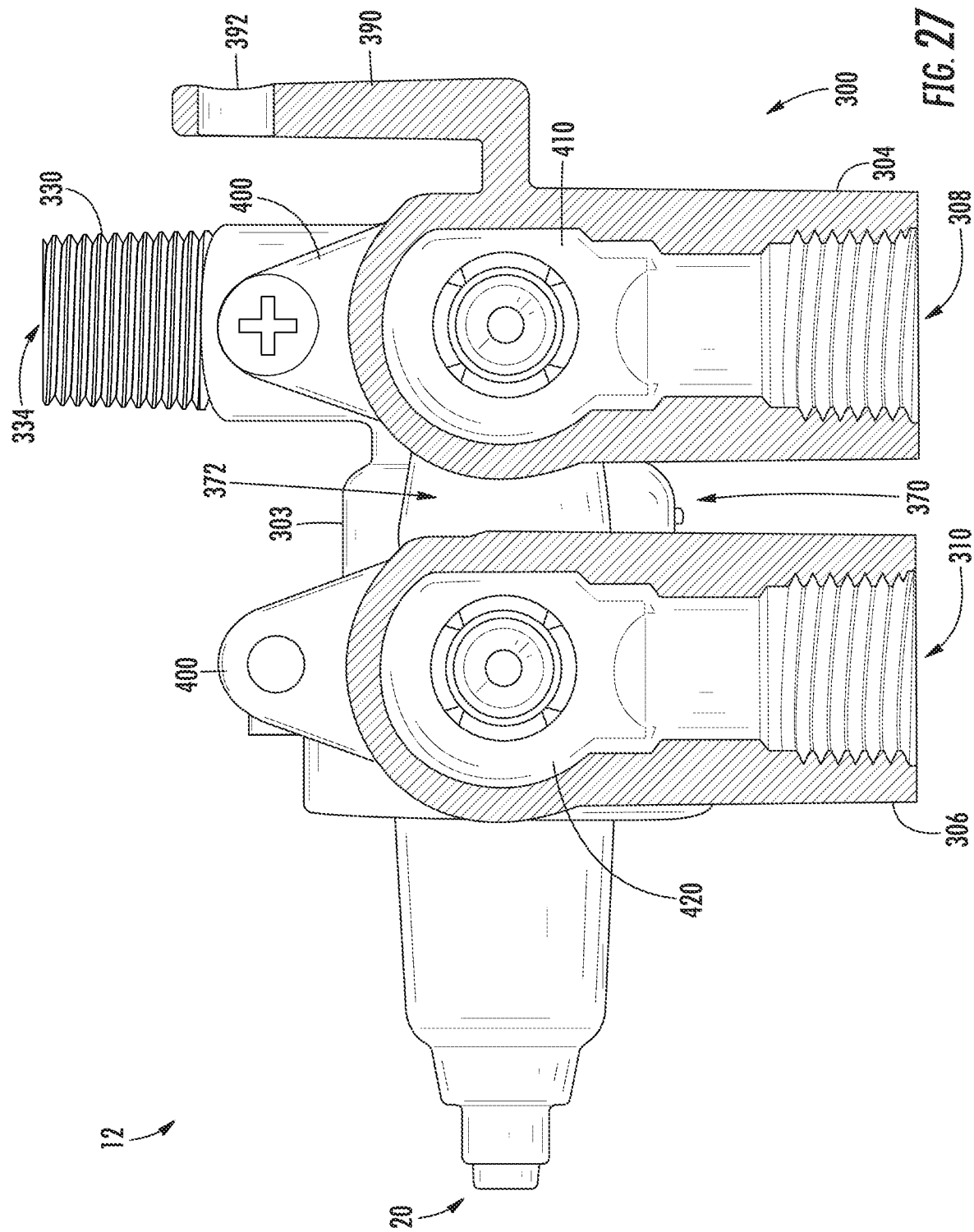

HOUSING FOR MULTIPLE MIXING VALVES

CROSS-REFERENCE TO RELATED PATENT APPLICATION

This application claims the benefit of U.S. Provisional Patent Application No. 62/672,218, filed May 16, 2018, which is incorporated herein by reference in its entirety.

TECHNICAL FIELD

The present disclosure relates to valve assemblies. More particularly, the present disclosure relates to a valve assembly including a housing configured to receive multiple valves.

BACKGROUND

In some systems, multiple devices each requiring a separate supply of fluid are used in close proximity to one another. In some such systems, each device requires that fluid be supplied at a different temperature, pressure, and/or flow rate. In one example of such a system, a faucet and an emergency facewash/eyewash system are arranged to both drain into the same sink. Faucets provide water at a temperature, pressure, and flow rate optimized for washing hands or other objects. Emergency eyewash or emergency facewash systems are designed to provide water to a focused region of a person such as their eyes or face, respectively. An emergency eyewash or emergency facewash system provides water at a temperature, pressure, and flow rate optimized for removing contaminants, such as chemicals, from the person's eyes or face. Accordingly, the faucet and the eyewash/facewash system each require a differently-configured water supply.

To supply fluid to multiple devices at different temperatures, pressures, or flow rates, a separate valve may be used for each device. Each valve may be connected to a hot fluid supply and a cold fluid supply and configured to mix hot and cold fluid to provide mixed fluid at a desired temperature, pressure, and flow rate. Each valve requires a separate conduit connecting the valve to a hot fluid supply and a separate conduit connecting the valve to a cold fluid supply. Accordingly, the use of multiple valves requires additional space for additional conduits. Additionally, each valve must be installed separately, requiring additional installation time. As such, there is a need for a system that is both compact and easy to install and that can supply separate flows of fluid at different temperatures, pressures, or flow rates to separate devices.

SUMMARY

At least one embodiment relates to a valve assembly. The valve assembly includes a first mixing valve configured to mix hot fluid and cold fluid to provide a first mixed fluid, a second mixing valve configured to mix hot fluid and cold fluid to provide a second mixed fluid, and a housing configured to receive the first mixing valve and the second mixing valve. The housing defines a hot fluid inlet configured to be fluidly coupled to a supply of hot fluid, a cold fluid inlet configured to be fluidly coupled to a supply of cold fluid, a hot fluid passage fluidly coupling the hot fluid inlet to the first mixing valve and the second mixing valve, and a cold fluid passage fluidly coupling the cold fluid inlet to the first mixing valve and the second mixing valve.

Another embodiment relates to a housing for a valve assembly. The housing includes a main body. The main body defines a first valve recess configured to receive a first mixing valve, a second valve recess configured to receive a second mixing valve, a hot fluid inlet configured to be fluidly coupled to a supply of hot fluid, a cold fluid inlet configured to be fluidly coupled to a supply of cold fluid, a hot fluid passage fluidly coupling the hot fluid inlet to the first valve recess and the second valve recess, and a cold fluid passage fluidly coupling the cold fluid inlet to the first valve recess and the second valve recess. The housing defines a heat transfer barrier extending between the hot fluid passage and the cold fluid passage and configured to resist heat transfer between the hot fluid passage and the cold fluid passage.

Another embodiment relates to a valve assembly. The valve assembly includes a housing, first and second check valve assemblies, and first and second mixing valves. The housing defines a first mixing valve recess, a second mixing valve recess, a hot fluid inlet configured to be fluidly coupled to a supply of hot fluid, a cold fluid inlet configured to be fluidly coupled to a supply of cold fluid, a hot fluid passage fluidly coupling the hot fluid inlet to each of the first mixing valve recess and the second mixing valve recess, and a cold fluid passage fluidly coupling the cold fluid inlet to each of the first mixing valve recess and the second mixing valve recess. The first check valve assembly is positioned within the hot fluid passage. The first check valve assembly includes a first check valve and a second check valve configured to prevent fluid flow through the hot fluid passage in opposing directions. The second check valve assembly is positioned within the cold fluid passage. The second check valve assembly includes a third check valve and a fourth check valve configured to prevent fluid flow through the cold fluid passage in opposing directions. The first mixing valve is coupled to the housing and extends within the first mixing valve recess. The second mixing valve is coupled to the housing and extends within the second mixing valve recess.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 27 a right section view of the valve assembly of FIG. 18.

DETAILED DESCRIPTION

Figure 1:
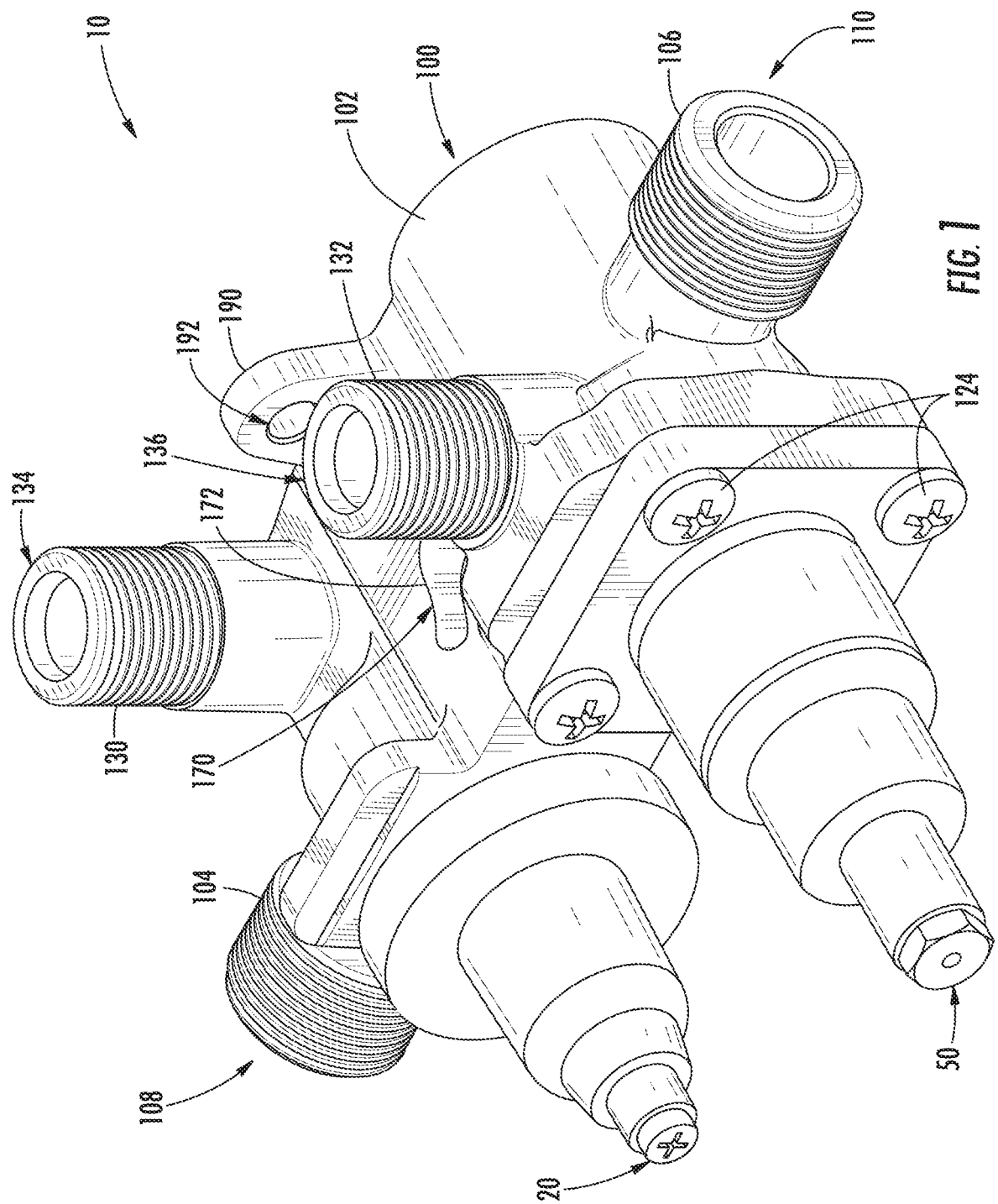
FIG. 1 is a perspective view of a valve assembly, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, various embodiments disclosed herein relate to a valve assembly including a pair of mixing valves each coupled to/included within a single housing. Each mixing valve is configured to receive hot fluid and cold fluid and provide mixed fluid at a desired temperature. Each mixing valve is governed by a different standard and is configured to provide mixed fluid to a different type of recipient device (e.g., an emergency fixture and a faucet). Each mixing valve may provide mixed fluid at a different temperature, pressure, and/or flow rate in accordance with the desired operation of the corresponding recipient device. In this regard and as described herein, the single valve housing defines one cold fluid inlet, one hot fluid inlet, and two independent mixed fluid outlets (one for each mixing valve). Thus, the hot fluid inlet feeds hot fluid to each of the mixing valves, while the cold fluid inlet feeds cold fluid to each of the mixing valves. In other alternate embodiments, more than one hot and/or cold fluid inlet may be utilized with the valves disposed within the housing.

The housing receives hot fluid at a hot fluid inlet and cold fluid at a cold fluid inlet and provides hot fluid and cold fluid to each of the mixing valves. In some embodiments, the valve assembly includes a first check valve located at the hot fluid inlet and a second check valve located at the cold fluid inlet to prevent hot fluid or cold fluid from leaving the valve assembly through either of the inlets. Hot fluid flows through the housing along a hot fluid flow path, the hot fluid flow path extending from the hot fluid inlet to the first mixing valve, through a hot fluid passage defined in the housing, and ultimately to the second mixing valve. Cold fluid flows through the housing along a cold fluid flow path, the cold fluid flow path extending from the cold fluid inlet to the second mixing valve, through a cold fluid passage defined in the housing, and ultimately to the first mixing valve. Having both mixing valves coupled to the same housing simplifies installation as opposed to a conventional arrangement having two separate mixing valves, as the entire valve assembly can be mounted at one time. Additionally, the valve assembly only requires a single hot fluid supply and a single cold fluid supply, which reduces the required number of supply lines for an application.

The hot fluid passage and the cold fluid passage pass in close proximity to each other within the housing. To reduce undesired heat transfer between the hot fluid in the hot fluid line and the cold fluid in the cold fluid line, the valve assembly includes a heat transfer barrier extending directly between the hot fluid line and the cold fluid line. The heat transfer barrier is more resistant to heat transfer than a material used in the housing, and thereby reduces the undesired heat transfer. In some embodiments, the heat transfer barrier is a void or passage defined by the housing. The void may be fluidly coupled to the surrounding atmosphere or otherwise filled with a gas that is resistant to heat transfer. Alternatively, the void may be at least partially filled with a solid or liquid material that is resistant to heat transfer. In other embodiments, the heat transfer barrier is a component that defines a portion of the hot fluid passage and/or the cold fluid passage and that is made of a material resistant to heat transfer. In such embodiments, the housing may be made from two or more separate sections, and the heat transfer barrier may structurally link the separate sections.

Referring now to FIG. 1, a valve assembly, shown as valve assembly 10, includes a first valve, shown as mixing valve 20, a second valve, shown as mixing valve 50, and a housing, shown as housing 100, that is coupled to the mixing valve 20 and the mixing valve 50. The valve assembly 10 is configured to receive hot fluid and cold fluid and output mixed fluid at two different temperatures. Each mixed fluid may then be provided to a different recipient device (e.g., an eyewash, a drench shower, a facewash, a faucet, a shower, etc.) for a different application. By way of example, the valve assembly 10 may be configured for use with a faucet and an eyewash each draining into the same sink. The eyewash may require water at a certain temperature, pressure, and flow rate. For the faucet, however, it may be desirable to provide water at a different temperature, pressure, and/or flow rate that is more comfortable or effective for washing hands or other objects. Accordingly, the valve assembly 10 may be configured to output water at each desired condition while requiring only a single hot water source and a single cold water source. Alternatively, the valve assembly 10 may be configured such that each mixed fluid is provided to a different recipient device where each recipient device is used for the same application. By way of example, the valve assembly 10 may supply mixed fluid to two different faucets in a restroom. This facilitates supplying mixed fluid to multiple devices using only one hot water supply and one cold water supply. In some embodiments, the fluid is water (e.g., purified water, tap water, etc.), however the valve assembly 10 may be configured to use other types of fluids as well (e.g., coolant, oil, food product, etc.).

Referring to FIGS. 1-6, the mixing valve 20 is a thermostatic mixing valve configured to combine hot water and cold water to produce mixed water suitable for use with one or more faucets. The mixing valve 20 is governed by the ASSE 1070 performance standard. Accordingly, the mixing valve 20 is configured to meet the ASSE 1070 hot water shut-off, cold water bypass, pressure and temperature variation, and cross flow test requirements. The mixing valve 20 receives hot water at up to 180 degrees Fahrenheit and is capable of outputting mixed water at between 95 and 120 degrees Fahrenheit, with a preferred output temperature of 105±3 degrees Fahrenheit. The mixing valve 20 has a minimum output flow rate of 0.35 gallons per minute, with a flow capacity of 4 gallons per minute at a pressure drop of 30 pounds per square inch.

The mixing valve 50 is a thermostatic mixing valve configured to combine hot and cold water to produce mixed water suitable for use with one or more emergency fixtures, such as an eyewash, a facewash, a drench shower, or a drench hose. The mixing valve 50 is governed by the ASSE 1071 standard. Accordingly, the mixing valve 50 is configured to meet the ASSE 1071 hot water-shut off, cold water bypass, pressure and temperature variation, and cross flow test requirements. The mixing valve 50 receives hot water at up to 180 degrees Fahrenheit and is capable of outputting mixed water at between 65 and 90 degrees Fahrenheit, with a preferred output temperature of 85±3 degrees Fahrenheit. The mixing valve 50 has a minimum output flow rate of 1.5 gallons per minute, with a flow capacity of 7.3 gallons per minute at a pressure drop of 30 pounds per square inch.

Although the mixing valve 20 and the mixing valve 50 are described as valves each governed by a specific different standard, it should be understood that the mixing valve 20 and the mixing valve 50 may be any type of mixing valve that combines hot fluid and cold fluid to provide mixed fluid. Accordingly, various valve characteristics (e.g., the output temperatures, the output flow rates, the output pressures, etc.) may vary between different embodiments. The mixing valve 20 and the mixing valve 50 may be manually controlled, electronically controlled, or self-adjusting (e.g., such as a thermostatic mixing valve). As shown in FIGS. 1-6, the mixing valve 20 and the mixing valve 50 are thermostatic mixing valves that each automatically self-adjust to provide mixed fluid at a desired temperature set-point. The temperature set-points for the mixing valve 20 and the mixing valve 50 may be manually adjusted by turning the screw 22 and the screw 52, respectively. In preferred embodiments, the temperature of the mixed fluid provided by the mixing valve 20 is different than the temperature of the mixed fluid provided by the mixing valve 50. However, in other embodiments, both the mixing valve 20 and the mixing valve 50 provide mixed fluid at the same temperature.

Figure 3:
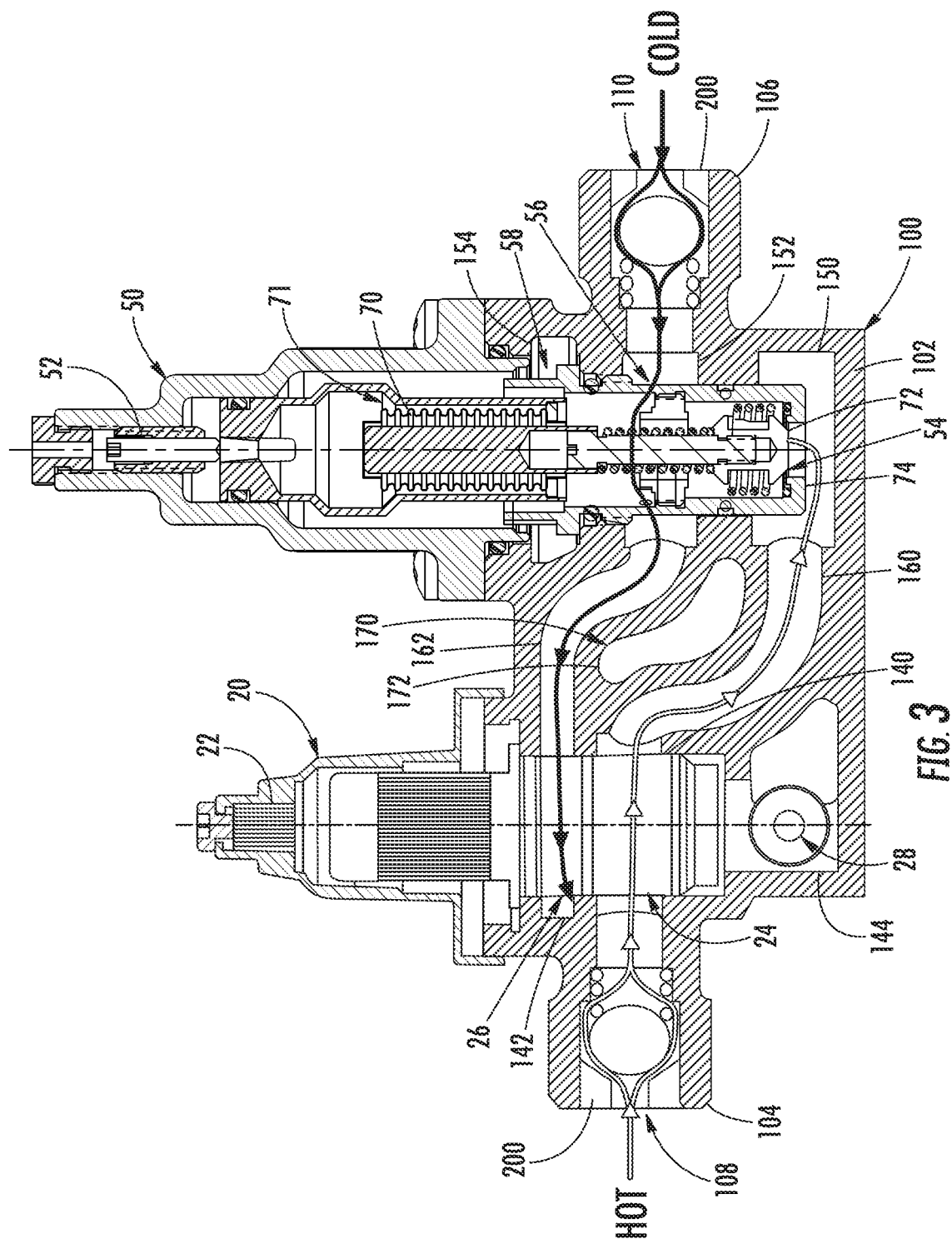
FIG. 3 is a bottom section view of the valve assembly of FIG. 1.

Referring to FIG. 3, the mixing valve 20 defines apertures, shown as hot fluid inlet 24 and cold fluid inlet 26, through which the mixing valve 20 receives hot fluid and cold fluid, respectively. The mixing valve 20 further defines an aperture, shown as mixed fluid outlet 28, through which the mixing valve 20 provides mixed fluid. The mixing valve 50 defines apertures, shown as hot fluid inlet 54 and cold fluid inlet 56, through which the mixing valve 50 receives hot fluid and cold fluid, respectively. The mixing valve 50 further includes a mixed fluid outlet 58, through which the mixing valve 50 provides mixed fluid. The hot fluid inlet 24, the cold fluid inlet 26, the mixed fluid outlet 28, the hot fluid inlet 54, the cold fluid inlet 56, and the mixed fluid outlet 58 are shown as being fluidly coupled to the housing 100 such that fluid passes through the housing 100 prior to entering and immediately after exiting the mixing valve 20 and the mixing valve 50.

Figure 2:
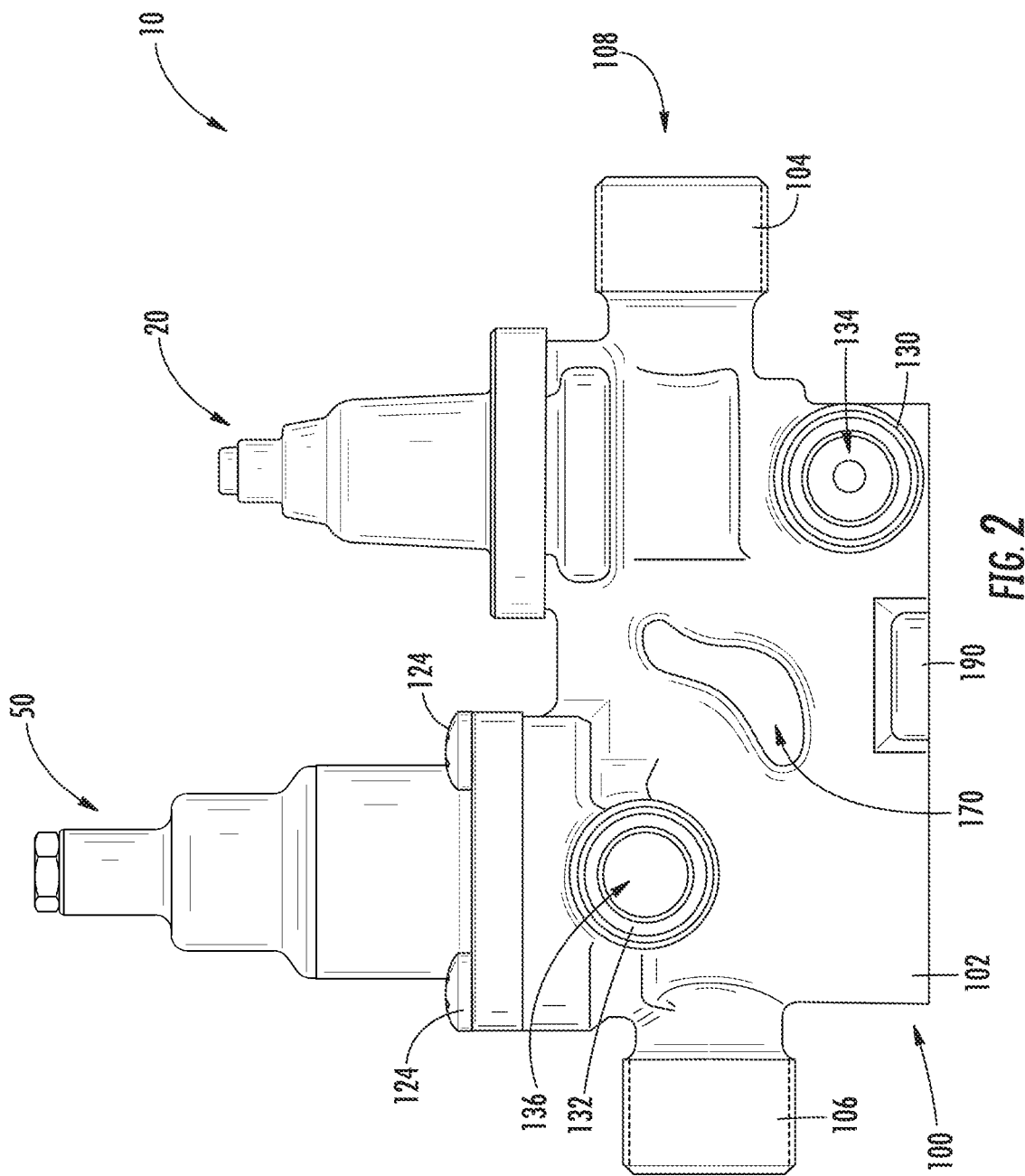
FIG. 2 is a top view of the valve assembly of FIG. 1.

Referring to FIGS. 1-3, the housing 100 includes a body, shown as main body 102. The housing 100 further includes a first protrusion, shown as hot fluid fitting 104, and a second protrusion, shown as cold fluid fitting 106, each extending laterally outward from the main body 102. The hot fluid fitting 104 defines an aperture, shown as hot fluid inlet 108, configured to receive hot fluid from a hot fluid supply (e.g., a water heater, a hot water reservoir, etc.). The cold fluid fitting 106 defines an aperture, shown as cold fluid inlet 110, configured to receive cold fluid from a cold fluid supply (e.g., a well, a cold water reservoir, a city water main, etc.). The hot fluid fitting 104 and the cold fluid fitting 106 may be configured with a standard connection interface (e.g., a threaded connection, a quick disconnect, a sleeve configured to be soldered to a copper pipe, etc.) to facilitate connection to the hot water supply and the cold water supply (e.g., through a conduit such as a hose or pipe, etc.).

Figure 6:
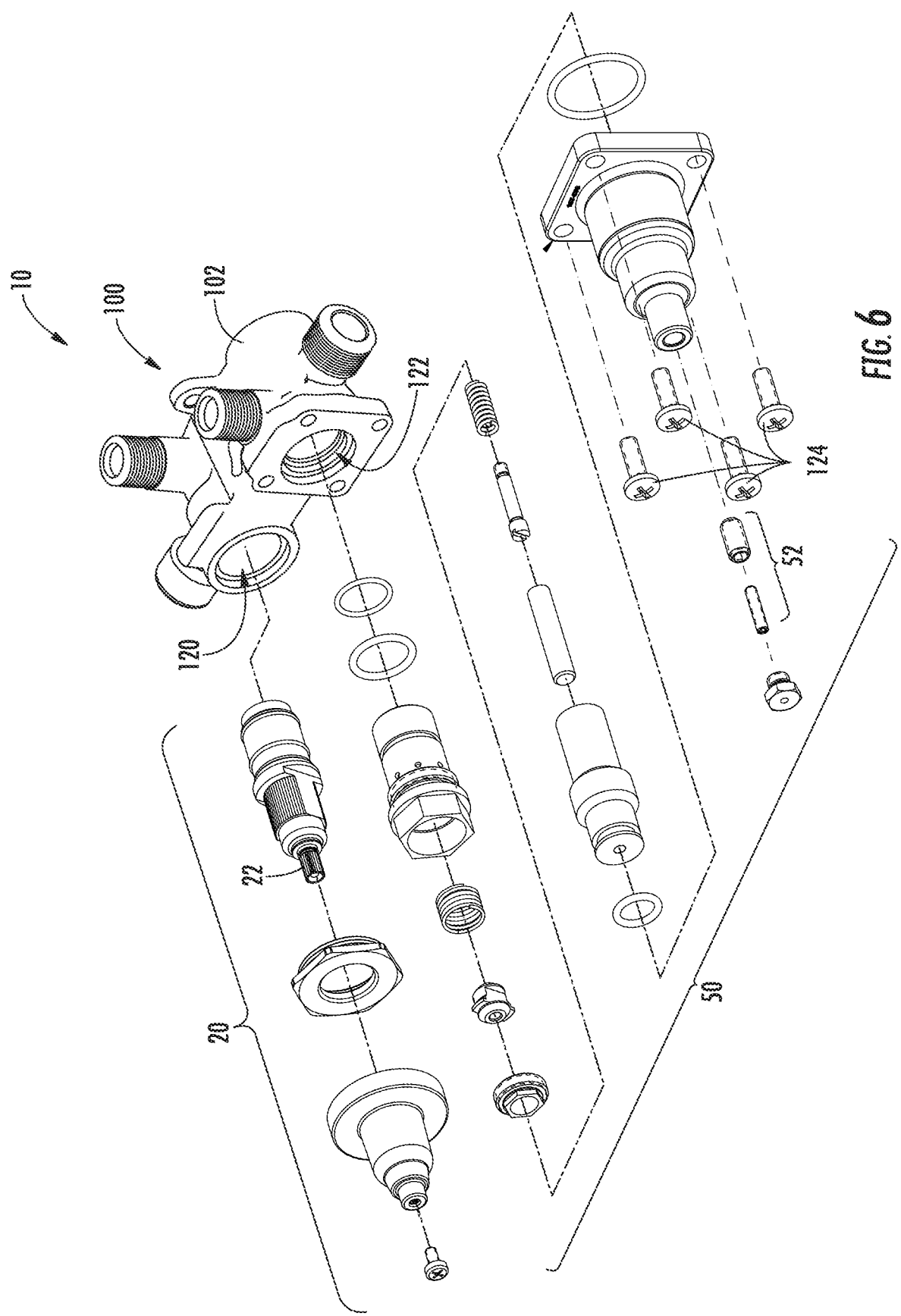
FIG. 6 is an exploded perspective view of the valve assembly of FIG. 1.

Referring to FIG. 6, the main body 102 defines a first recess, shown as first valve recess 120, configured to receive the first mixing valve 20 and a second recess, shown as second valve recess 122, configured to receive the second mixing valve 50. The main body 102 is configured to couple to the first mixing valve 20 and the second mixing valve 50. Accordingly, a portion of the first valve recess 120 may be threaded to engage with a corresponding external thread on the first mixing valve 20. The second mixing valve 50 is fastened to the main body 102 using fasteners, shown as fasteners 124. Alternatively, the first mixing valve 20 and the second mixing valve 50 may be fastened, adhered, pressed, welded, or otherwise coupled to the main body 102.

Referring to FIG. 1, the housing 100 further includes a third protrusion, shown as outlet fitting 130, and a fourth protrusion, shown as outlet fitting 132, each extending vertically from the main body 102. In other embodiments, the outlet fitting 130 and/or the outlet fitting 132 may extend from a different side of the main body 102. The outlet fitting 130 defines an aperture, shown as mixed fluid outlet 134, configured to receive mixed fluid from the first mixing valve 20. The outlet fitting 132 defines an aperture, shown as mixed fluid outlet 136, configured to receive mixed fluid from the second mixing valve 50. The outlet fitting 130 and the outlet fitting 132 may be configured with a standard connection interface (e.g., a threaded connection, a quick disconnect, a sleeve configured to be soldered to a copper pipe, etc.) to facilitate connection to the recipient devices (e.g., through a conduit such as a hose or pipe). Alternatively, in embodiments where the mixed water flows directly from the mixing valve 20 and the mixing valve 50 to the respective recipient devices, the outlet fitting 130, the outlet fitting 132, the mixed fluid outlet 134, and the mixed fluid outlet 136 may be omitted.

Figure 4:
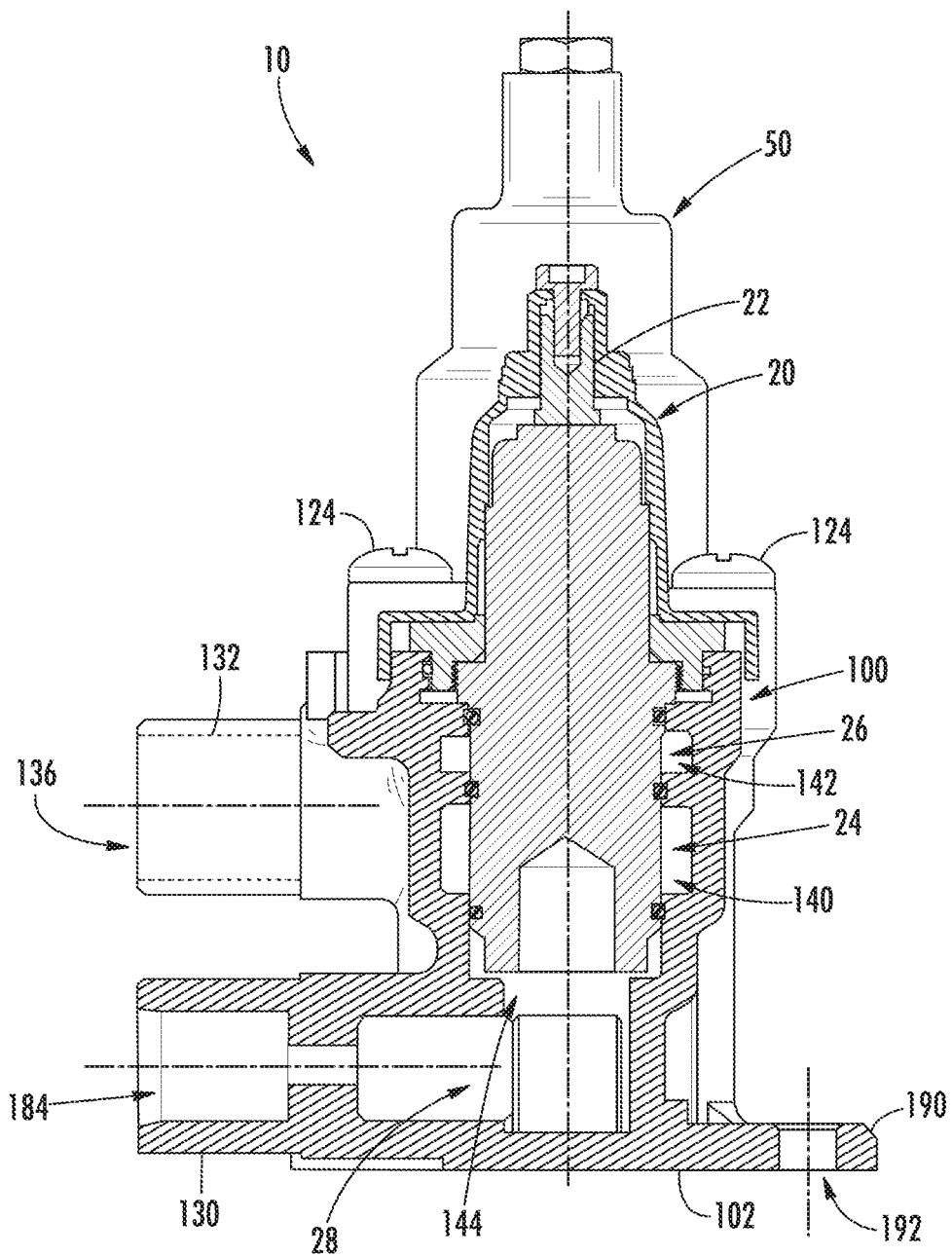
FIG. 4 is a left section view of the valve assembly of FIG. 1.

Referring to FIGS. 3, 4, and 6, after the first mixing valve 20 is inserted into the first valve recess 120, the first mixing valve 20 seals against the housing 100 such that the housing 100 and the first mixing valve 20 cooperate to define a first chamber, shown as first hot fluid chamber 140, a second chamber, shown as first cold fluid chamber 142, and a third chamber, shown as first mixed fluid chamber 144 (e.g., the first mixing valve 20 seals against the housing 100 to divide the first valve recess 120 into multiple chambers). As shown, the first hot fluid chamber 140, the first cold fluid chamber 142, and the first mixed fluid chamber 144 include portions of the first valve recess 120. The first mixing valve 20 may include one or more 0-rings or other varieties of seals to facilitate such sealing. The first hot fluid chamber 140 is fluidly coupled to the hot fluid inlet 24. The first cold fluid chamber 142 is fluidly coupled to the cold fluid inlet 26. The first mixed fluid chamber 144 is fluidly coupled to the mixed fluid outlet 28.

Figure 5:
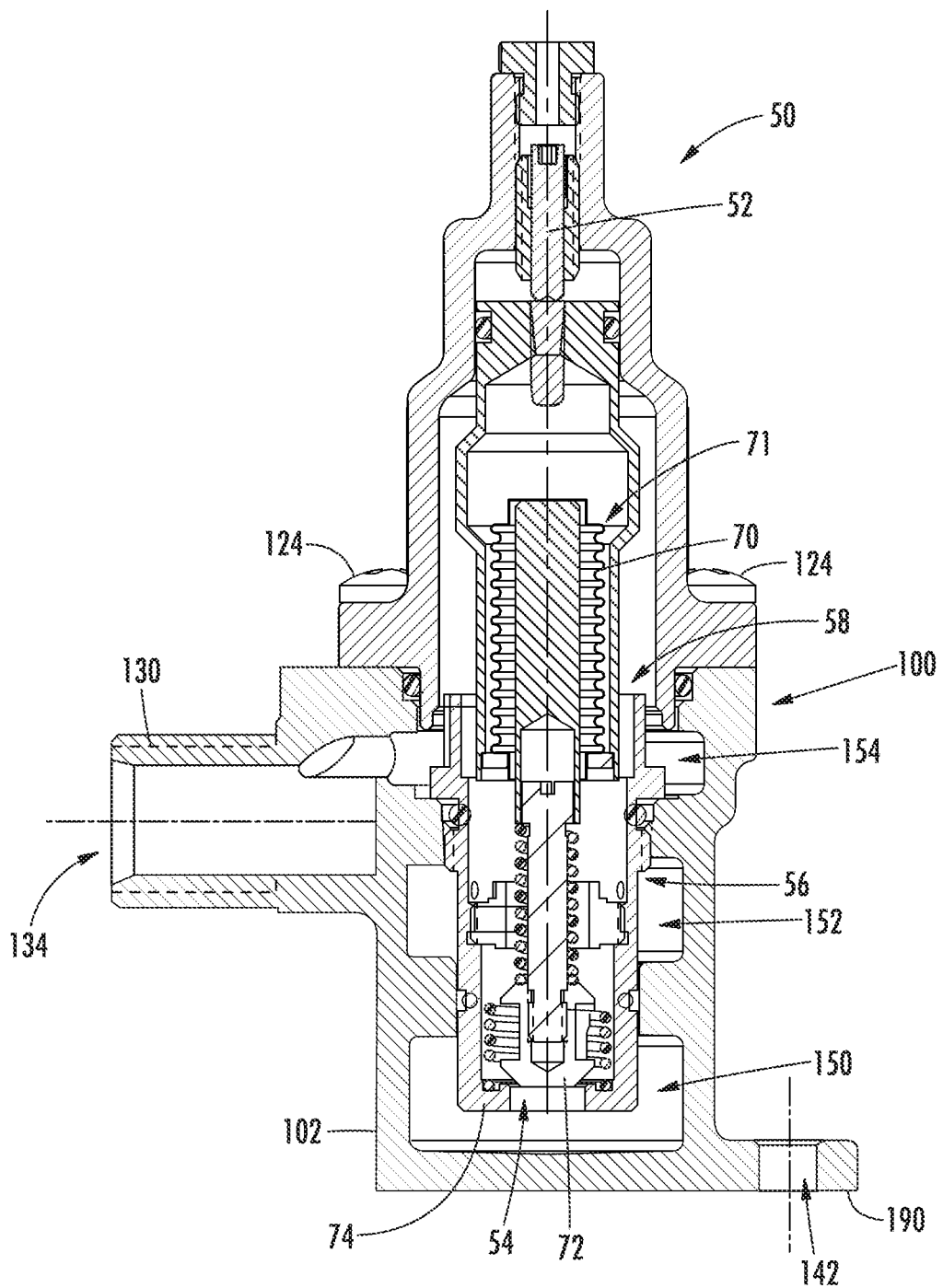
FIG. 5 is another left section view of the valve assembly of FIG. 1.

Referring to FIGS. 3, 5, and 6, after the second mixing valve 50 is inserted into the second valve recess 122, the second mixing valve 50 seals against the housing 100 such that the housing 100 and the second mixing valve 50 cooperate to define a fourth chamber, shown as second hot fluid chamber 150, a fifth chamber, shown as second cold fluid chamber 152, and a sixth chamber, shown as second mixed fluid chamber 154 (e.g., the second mixing valve 50 seals against the housing 100 to divide the second valve recess 122 into multiple chambers). As shown, the second hot fluid chamber 150, the second cold fluid chamber 152, and the second mixed fluid chamber 154 include portions of the second valve recess 122. The second mixing valve 50 may include one or more O-rings or other varieties of seals to facilitate such sealing. The second hot fluid chamber 150 is fluidly coupled to the hot fluid inlet 54. The second cold fluid chamber 152 is fluidly coupled to the cold fluid inlet 56. The second mixed fluid chamber 154 is fluidly coupled to the mixed fluid outlet 58.

Referring again to FIG. 3, the main body 102 further defines a first passage, shown as hot fluid passage 160, and a second passage, shown as cold fluid passage 162. The hot fluid passage 160 and the cold fluid passage 162 are defined within the interior of the main body 102. The hot fluid passage 160 fluidly couples the first hot fluid chamber 140 to the second hot fluid chamber 150. The cold fluid passage 162 fluidly couples the first cold fluid chamber 142 to the second cold fluid chamber 152.

During operation, hot fluid passes from the hot fluid inlet 108 to the first mixing valve 20 and subsequently to the second mixing valve 50 along a hot fluid flow path. The hot fluid flow path is illustrated as a white arrow in FIG. 3. Hot fluid enters through the hot fluid inlet 108 and passes into the first hot fluid chamber 140. A portion of the hot fluid passes into the first mixing valve 20 through the hot fluid inlet 24, and the remaining hot fluid passes around the first mixing valve 20. In some embodiments, the hot fluid inlet 24 extends around the first mixing valve 20 such that hot fluid can pass through the hot fluid inlet 24 and back into the first hot fluid chamber 140. Hot fluid passes from the first hot fluid chamber 140 into the hot fluid passage 160. This hot fluid then passes from the hot fluid passage 160 into the second hot fluid chamber 150. Once in the second hot fluid chamber 150, hot fluid enters into the second mixing valve 50 through the hot fluid inlet 54. Accordingly, both the first mixing valve 20 and the second mixing valve 50 are fluidly coupled to the hot water supply through the hot water flow path.

Similarly, during operation, cold fluid passes from the cold fluid inlet 110 to the second mixing valve 50 and subsequently to the first mixing valve 20 along a cold fluid flow path. The cold fluid flow path is illustrated as a black arrow in FIG. 3. Cold fluid enters through the cold fluid inlet 110 and passes into the second cold fluid chamber 152. A portion of the cold fluid passes into the second mixing valve 50 through the cold fluid inlet 56, and the remaining cold fluid passes around the second mixing valve 50. In some embodiments, the cold fluid inlet 56 extends around the second mixing valve 50 such that cold fluid can pass through the cold fluid inlet 56 and back into the second cold fluid chamber 152. Cold fluid passes from the second cold fluid chamber 152 into the cold fluid passage 162. This cold fluid then passes from the cold fluid passage 162 into the first cold fluid chamber 142. Once in the first cold fluid chamber 142, cold fluid enters into the first mixing valve 20 through the cold fluid inlet 26. Accordingly, both the first mixing valve 20 and the second mixing valve 50 are fluidly coupled to the cold fluid supply through the cold fluid flow path.

When there is demand for mixed fluid from the first mixing valve 20 (e.g., when the pressure of the mixed fluid or any gas at the mixed fluid outlet 134 is relatively low compared to the pressure of the hot fluid at the hot fluid inlet 108 and/or the cold fluid at the cold fluid inlet 110), the first mixing valve 20 mixes hot fluid and cold fluid to provide mixed fluid of a first temperature. The hot fluid enters the mixing valve 20 through the hot fluid inlet 24, and the cold fluid enters the mixing valve 20 through the cold fluid inlet 26. Based on the temperature setting of the first mixing valve 20, the first mixing valve 20 mixes the hot fluid and the cold fluid in various proportions to provide mixed fluid at the first temperature. The mixed fluid exits the first mixing valve 20 through the mixed fluid outlet 28 into the first mixed fluid chamber 144. The mixed fluid then passes to the recipient device through the mixed fluid outlet 134.

When there is demand for mixed fluid from the second mixing valve 50 (e.g., when the pressure of the mixed fluid or any gas at the mixed fluid outlet 136 is relatively low compared to the pressure of the hot fluid at the hot fluid inlet 108 and/or the cold fluid at the cold fluid inlet 110), the second mixing valve 50 mixes hot fluid and cold fluid to provide mixed fluid of a second temperature. The hot fluid enters the second mixing valve 50 through the hot fluid inlet 54, and the cold fluid enters the second mixing valve 50 through the cold fluid inlet 56. Based on the temperature setting of the second mixing valve 50, the second mixing valve 50 mixes the hot fluid and the cold fluid in various proportions to provide mixed fluid at the second temperature. The mixed fluid exits the second mixing valve 50 through the mixed fluid outlet 58 into the second mixed fluid chamber 154. The mixed fluid then passes to the recipient device through the mixed fluid outlet 136.

The first mixing valve 20 and the second mixing valve 50 are operable independent of one another. By way of example, the first mixing valve 20 may supply mixed fluid at the first temperature while the second mixing valve 50 provides no fluid. By way of another example, the rate at which the second mixing valve 50 provides mixed fluid of the first temperature may be varied while the rate at which the first mixing valve 20 provides mixed fluid of the second temperature remains constant. Additionally, the first temperature may or may not be equal to the second temperature.

The mechanisms used to control the temperatures of the mixed fluid provided by the first mixing valve 20 and the second mixing valve 50 may vary depending upon the type of mixing valve used. By way of example, if a manual mixing valve is used, a handle may be rotated (e.g., by hand) to control the sizes of orifices through which the hot fluid and/or cold fluid pass, thereby varying the flows of hot fluid and cold fluid. As shown in FIGS. 3 and 5, the second mixing valve 50 is a thermostatic mixing valve that includes a biasing element, shown as bellows 70, positioned within a chamber 71, a valve element 72, and a stationary member, shown as valve seat 74. The chamber 71 is filled with temperature-sensitive material (e.g., wax, gas, etc.) that is thermally coupled to (e.g., partially surrounded by) the mixed fluid. The temperature-sensitive material expands or contracts as it gets hotter or colder, respectively, imparting a variable force on the bellows 70 and causing the bellows 70 to contract or expand. The valve element 72 is coupled to the bellows 70 such that an expansion or contraction of the bellows 70 causes the valve element 72 to translate relative to the valve seat 74. The valve seat 74 defines an aperture (e.g., the hot fluid inlet 54) through which the hot fluid enters. As the valve element 72 translates relative to the valve seat 74, the portion of the aperture covered by the valve element 72 varies, varying the flow of hot fluid into the second mixing valve 50 and thereby varying the temperature of the mixed fluid. In some embodiments, the flow of cool fluid into the mixing valve 50 is not affected by movement of the valve element 72 (e.g., the cold fluid inlet 56 has a constant cross-sectional area). Accordingly, in the event that the mixing valve 50 or the hot fluid supply malfunction (e.g., such that the hot fluid increases in temperature or too much hot fluid is supplied to the chamber 71), cold fluid may always be provided to prevent scalding the user. By way of yet another example, an electronically-controlled valve may be used. The electronically-controlled valve includes an actuator configured to control the sizes of orifices through which the hot fluid and/or cold fluid pass, thereby varying the flows of hot fluid and cold fluid.

Referring to FIG. 3, due to the proximity of the hot fluid passage 160 to the cold fluid passage 162, heat is transferred from the hot fluid within the hot fluid passage 160 to the cold fluid within the cold fluid passage 162. This heat transfer increases the temperature of the cold fluid provided to the first mixing valve 20 and reduces the temperature of the hot fluid provided to the second mixing valve 50, reducing the temperature differential (i.e., the difference in temperature) between the hot fluid and the cold fluid provided to each valve. A larger temperature differential is desirable, as a larger temperature differential increases the range of temperatures that a mixing valve can provide. Accordingly, it is desirable to reduce the amount of heat transfer between the hot fluid passage 160 and the cold fluid passage 162.

Referring to FIGS. 1-3, 7, and 8, the housing 100 includes or defines an insulating element, shown as heat transfer barrier 170, that is configured to reduce the heat transfer (e.g., reduce the rate of heat transfer for a given set of conditions, reduce the total amount of heat transfer for a given period of operation, etc.) between hot fluid in the hot fluid passage 160 and cold fluid in the cold fluid passage 162. The heat transfer barrier 170 may or may not reduce heat transfer between the hot fluid or the cold fluid and the surrounding atmosphere. The heat transfer barrier 170 extends directly between the hot fluid passage 160 and the cold fluid passage 162. The heat transfer barrier 170 provides greater insulative properties (i.e., is a worse conductor of heat, is more resistant to heat transfer) than another portion of the housing 100 (e.g., the portion of the housing 100 surrounding the heat transfer barrier 170, etc.). Accordingly, the heat transfer barrier 170 is configured to reduce heat transfer between the hot fluid passage 160 and the cold fluid passage 162 relative to an embodiment of the housing 100 where the heat transfer barrier 170 is omitted (e.g., if the material of the housing 100 immediately adjacent the heat transfer barrier 170 were extended to take the place of the heat transfer barrier 170, etc.).

In the embodiment shown in FIGS. 1-3, the heat transfer barrier 170 is a void 172 (e.g., opening, aperture, hole, etc.) that extends through the entirety of the housing 100 (e.g., from a top surface to a bottom surface). Accordingly, the heat transfer barrier 170 is fluidly coupled to the surrounding atmosphere and fills with gas (e.g., air) from the surrounding atmosphere from multiple sides of the housing 100. This gas is free to flow into or out of the housing 100 along either end of the void 172. This gas is a worse conductor of heat than the material of the housing 100, and accordingly reduces heat transfer between the hot fluid passage 160 and the cold fluid passage 162. By way of example, the gas may be air. The entire housing 100 may be cast or molded from a single material such as brass, stainless steel, aluminum, or plastic. Constructing the housing 100 from a material that is a good conductor of heat may be desired, as that material may have other beneficial properties such as durability or ease of manufacture. In an alternative embodiment, the aperture that defines the void 172 extends only partway through the housing 100 such that the void 172 is bounded by the housing 100 on all sides or all but one side. Accordingly, the void 172 is fluidly coupled to the surrounding atmosphere on one side of the housing 100. In yet another alternative embodiment, the heat transfer barrier 170 is not exposed to the surroundings (i.e., is not fluidly coupled to the surrounding atmosphere). In such an embodiment, the void 172 is surrounded entirely by the housing 100. The housing 100 may be formed in multiple parts (e.g., in two separate halves) that are attached together, forming the void 172 between them. Alternatively, the housing 100 may be formed with an aperture extending entirely or partway through the housing 100 to define the void 172, and one or more covers may be coupled to the housing 100 to fluidly decouple the void 172 from the surrounding atmosphere.

Although the void 172 is shown as having one cross-sectional shape that is constant throughout the thickness of the housing 100, it should be understood that the cross-sectional shape of the void 172 may be varied in other embodiments. The void 172 may have straight or curved sides, may be square, rectangular, circular, or otherwise shaped, and may change in shape throughout the thickness of the housing 100. The entire void 172 may vary in size, or a portion of the void 172 may vary in size. Accordingly, the void 172 may vary in size throughout the thickness of the housing 100. The heat transfer barrier 170 may include multiple separate voids 172, or multiple voids 172 connected by one or more apertures or channels.

Figure 7:
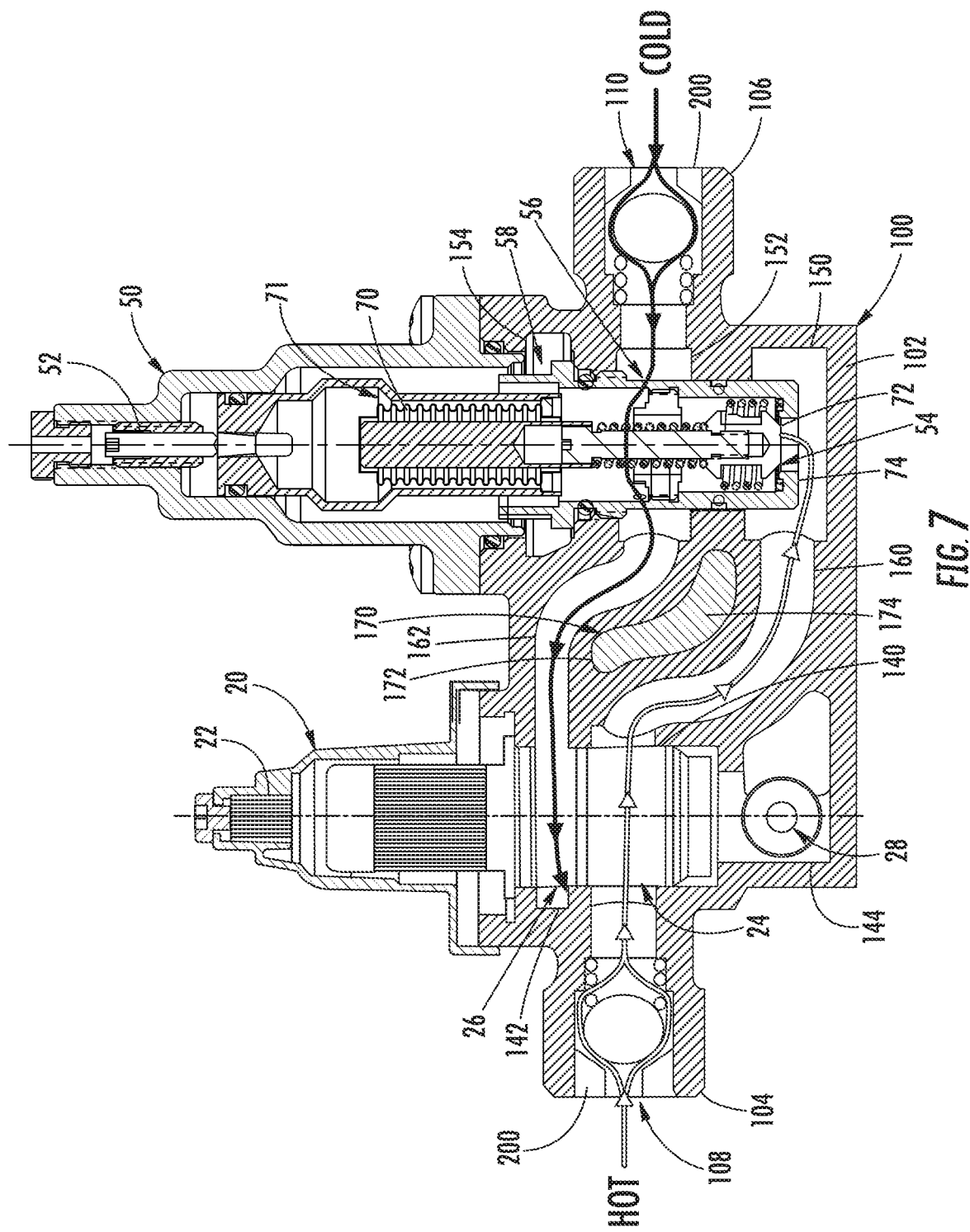
FIG. 7 is a bottom section view of a valve assembly, according to another exemplary embodiment.

Referring to FIG. 7, the heat transfer barrier 170 is a void 172 as shown in FIGS. 1-3, but the void 172 is filled partially or entirely with a solid or liquid material 174 that is a worse conductor of heat than the material of the housing 100. By way of example, the material 174 may be a liquid (e.g., a viscous fluid such as a gel, a foam, or a resin, an oil, etc.) that is inserted (e.g., poured, injected, etc.) into the void 172. Such a liquid may be resistant to heat transfer, and/or the liquid may additionally entrain a gas (e.g., air) that is resistant to heat transfer. It should be understood that such a liquid may cure or otherwise solidify after insertion into the void 172. By way of another example, the material 174 may be a solid (e.g., plastic, rubber, hardened resin, fiberglass, Styrofoam, etc.). A solid material 174 may be machined, molded, printed using additive manufacturing, assembled from multiple pieces, or otherwise initially formed to the shape of the void 172 and subsequently inserted (e.g., pressed, placed, etc.) into the void 172. Alternatively, a solid material 174 may be deformed (e.g., compressed, etc.) such that the material 174 is small enough to fit into the void 172 and then inserted into the void 172 and allowed to expand to fill the shape of the void 172.

Figure 8:
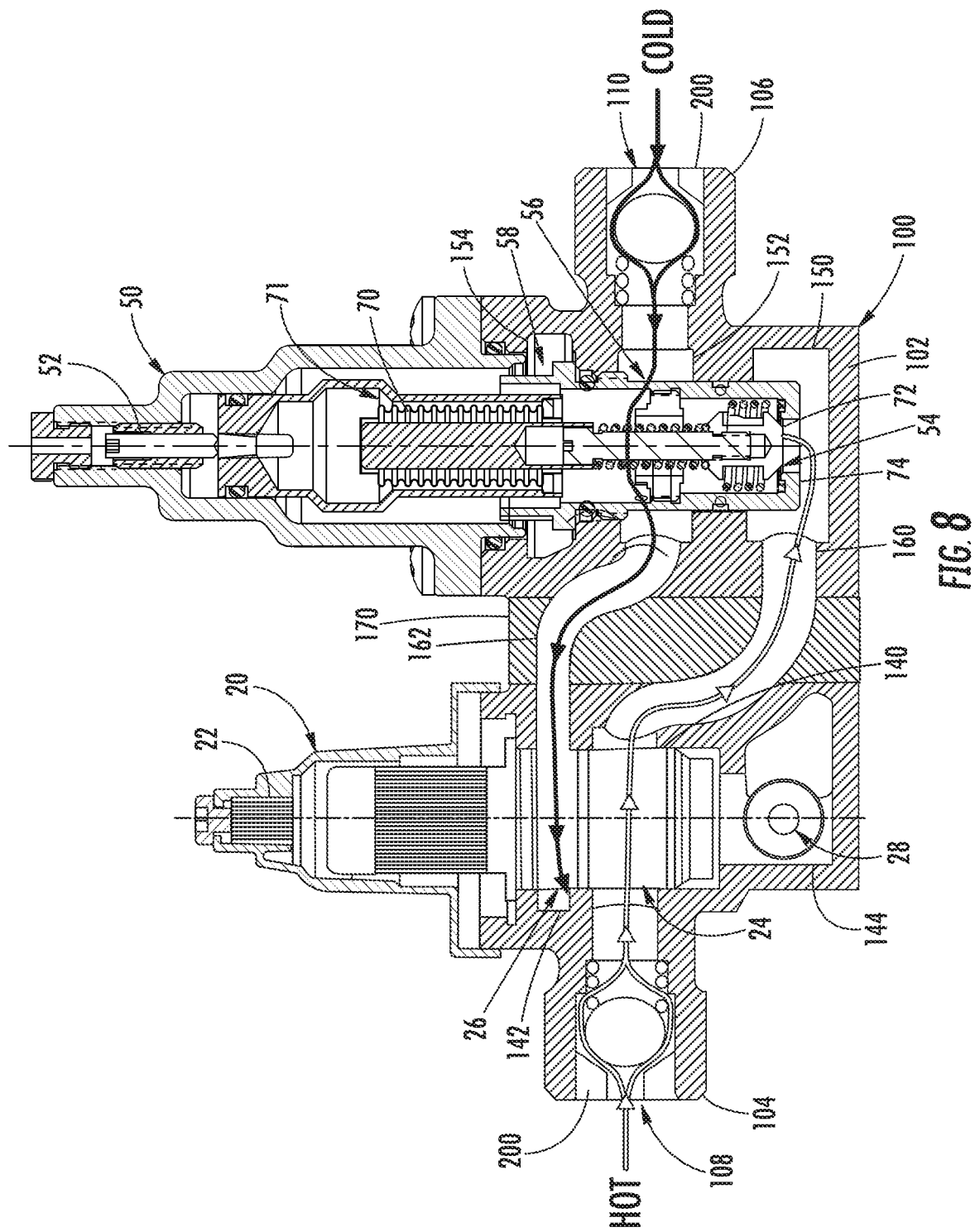
FIG. 8 is a bottom section view of a valve assembly, according to another exemplary embodiment.
Figure 9:
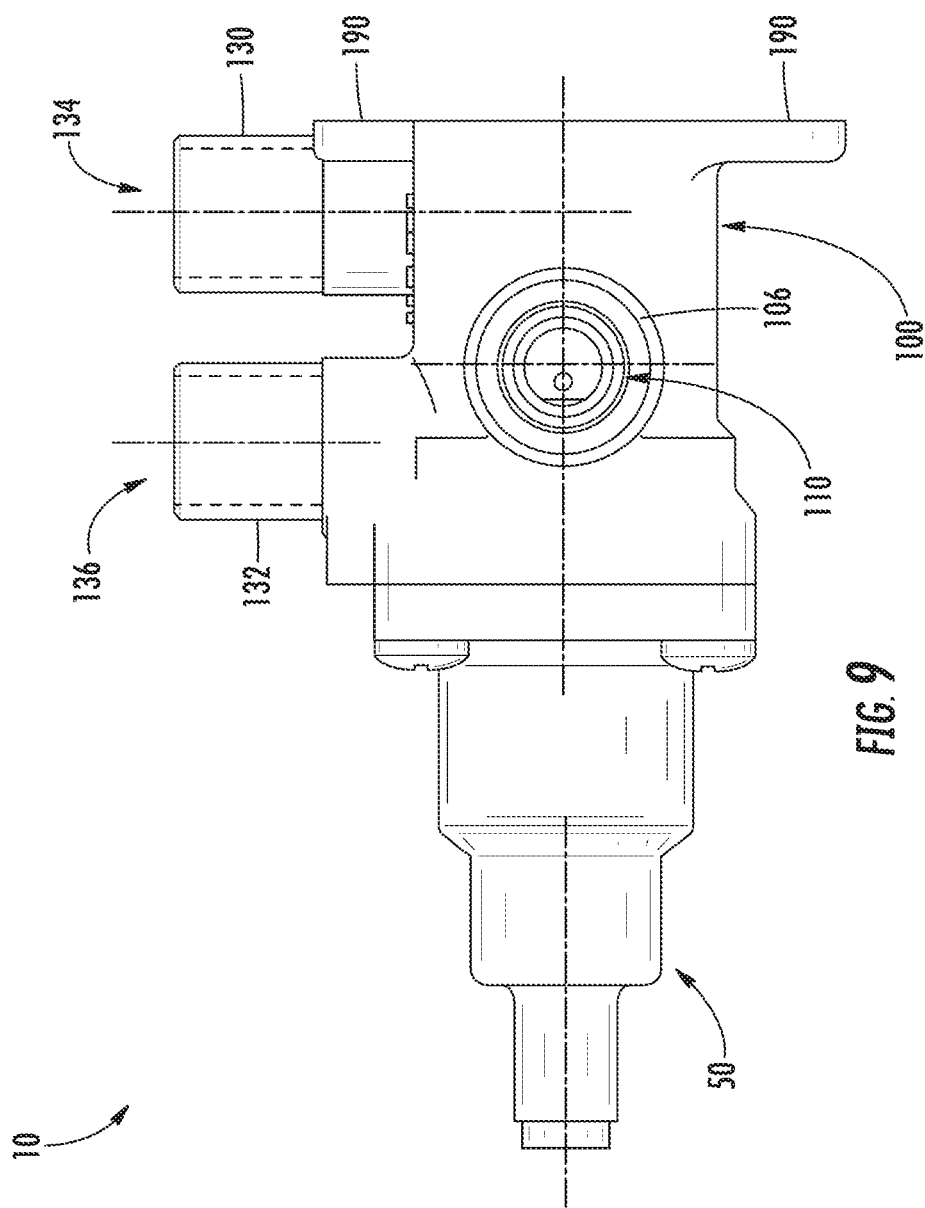
FIG. 9 is a right side view of the valve assembly of FIG. 1.
Figure 10:
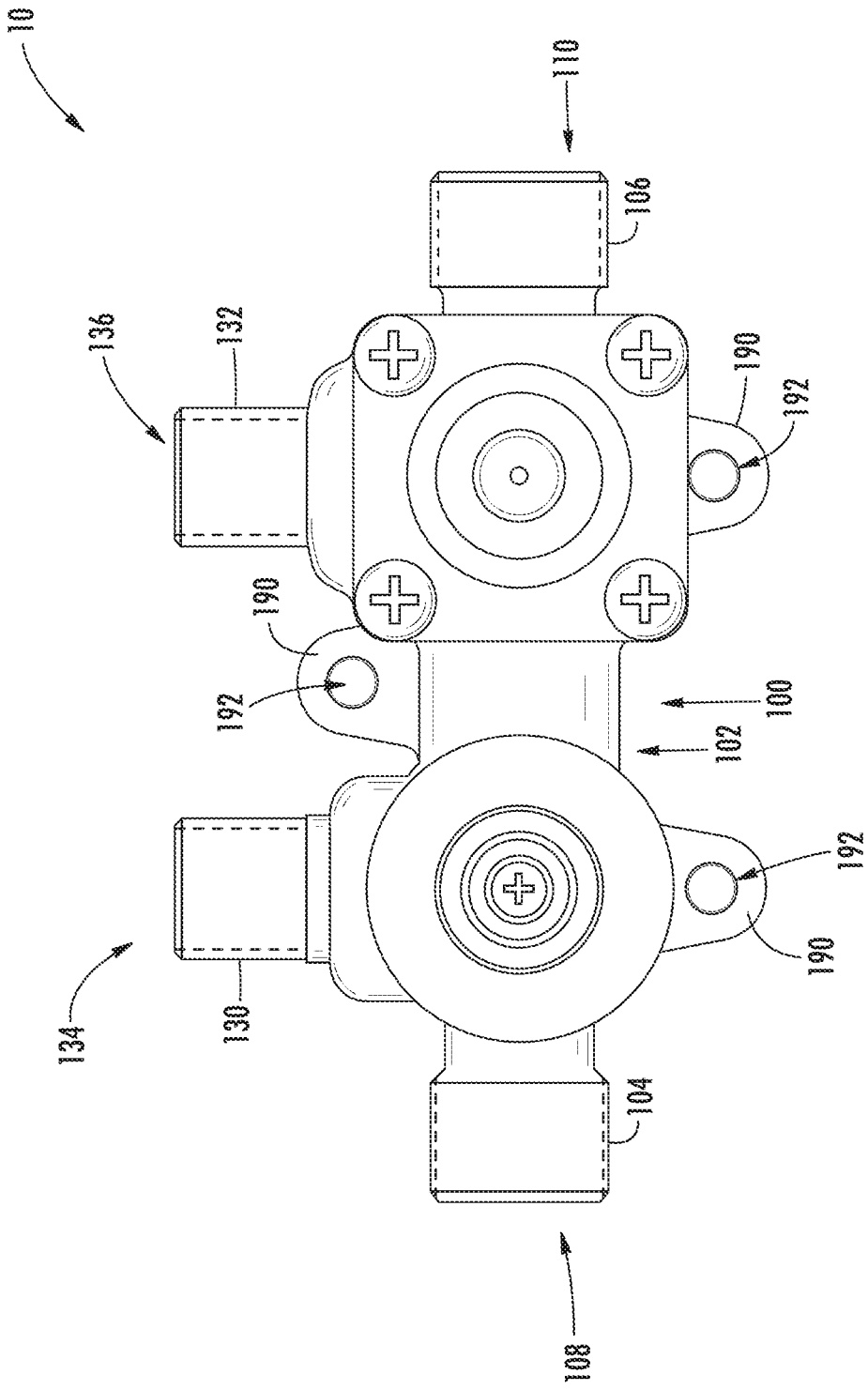
FIG. 10 is a front side view of the valve assembly of FIG. 1.
Figure 11:
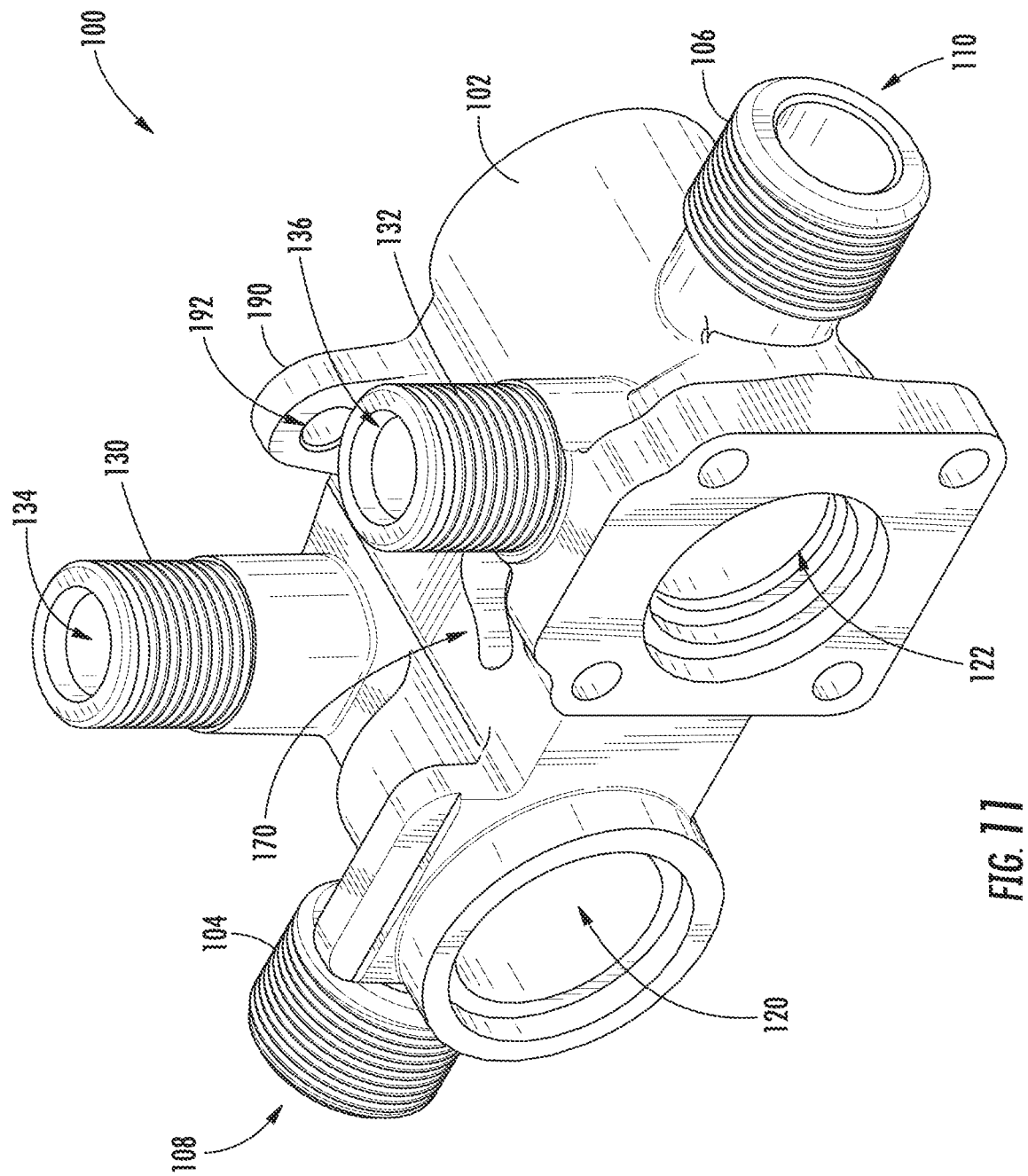
FIG. 11 is a perspective view of a housing of the valve of FIG. 1.
Figure 12:
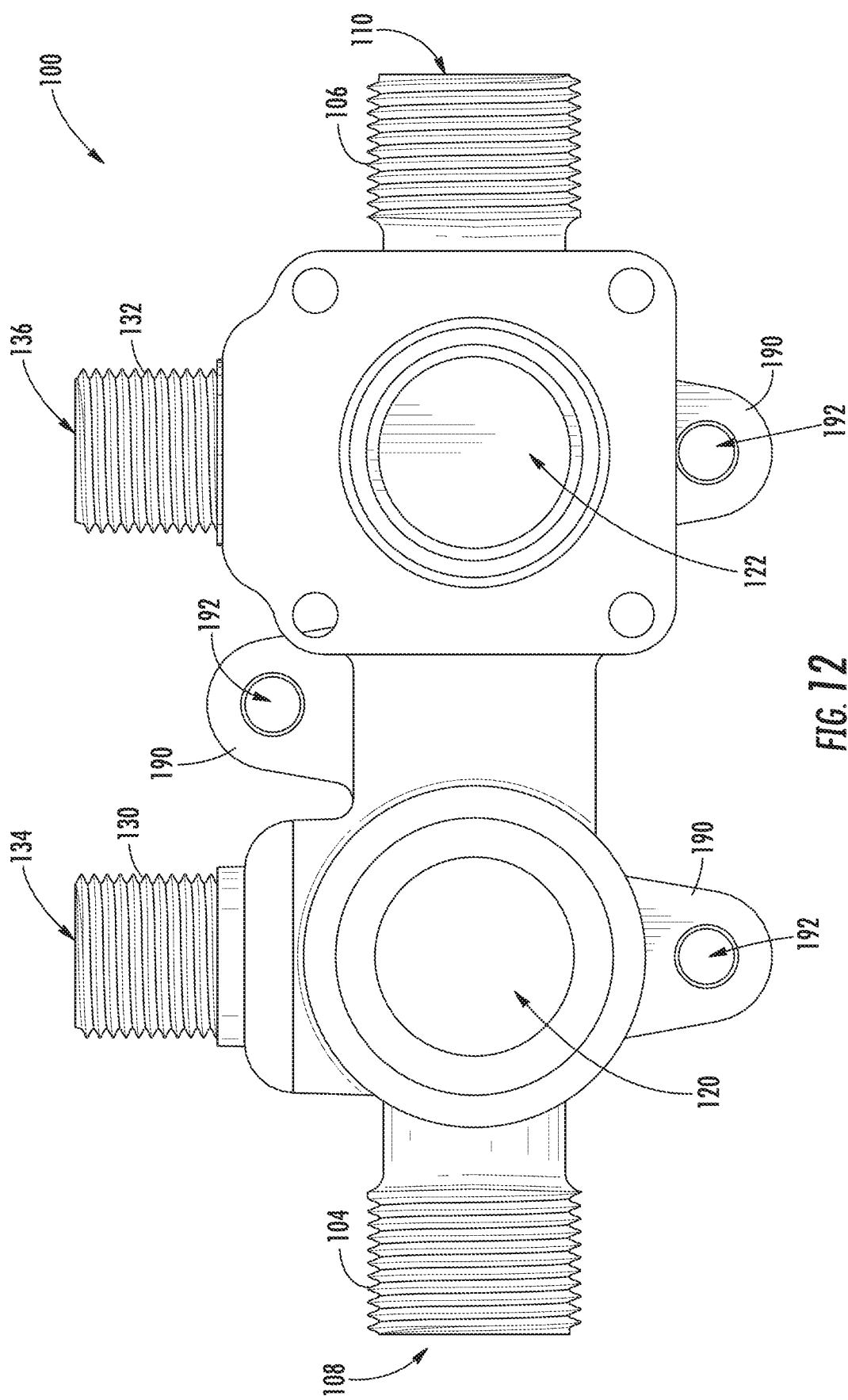
FIG. 12 is a front view of the housing of FIG. 11.
Figure 13:
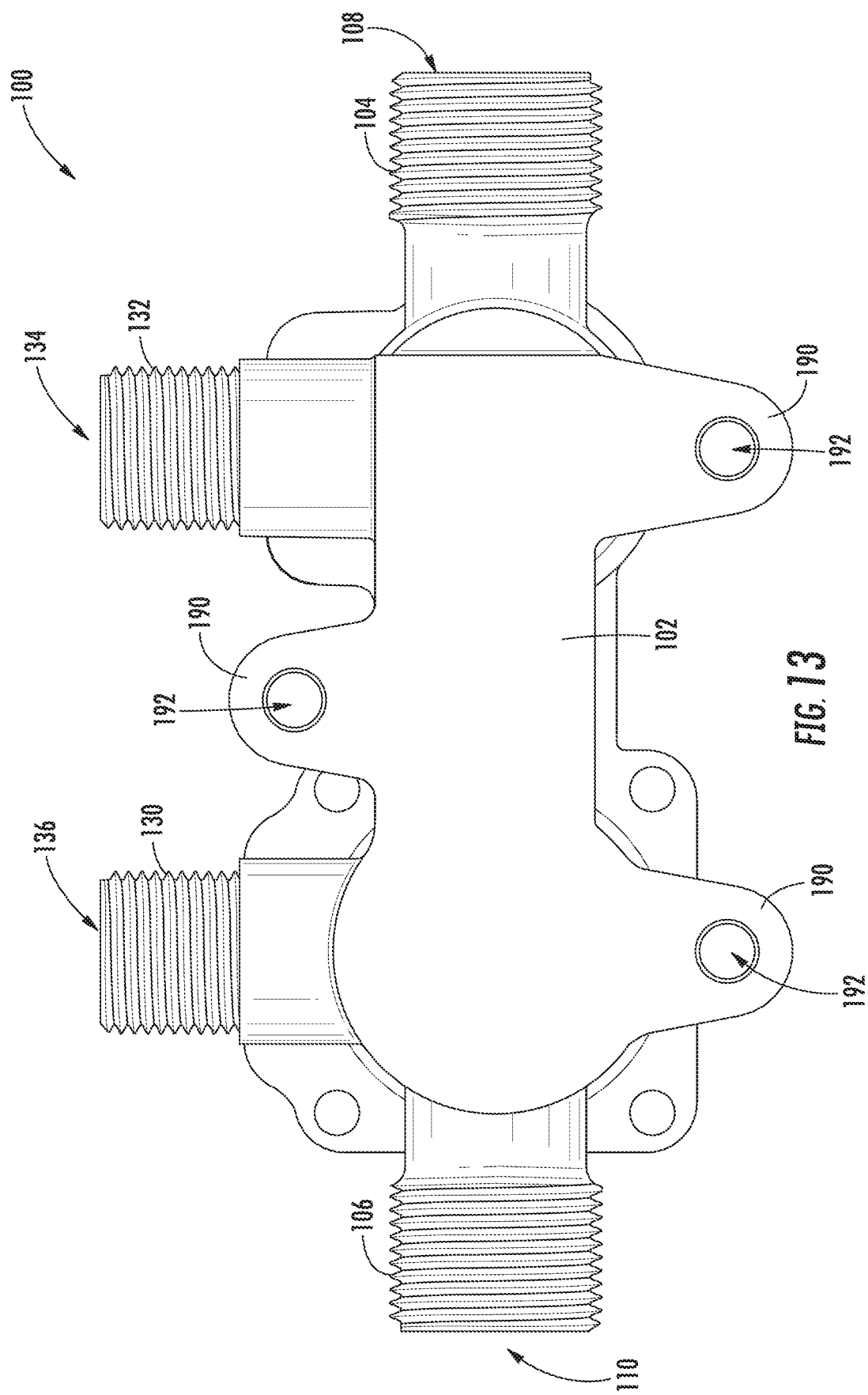
FIG. 13 is a rear view of the housing of FIG. 11.
Figure 14:
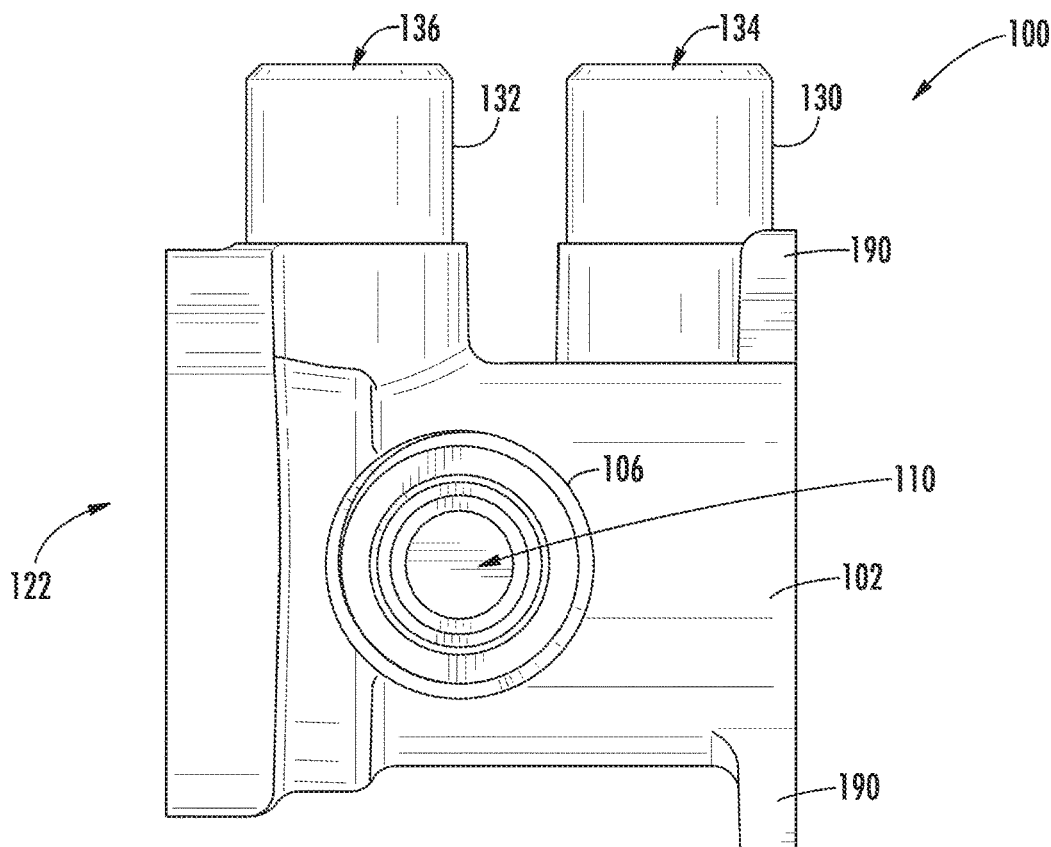
FIG. 14 is a right side view of the housing of FIG. 11.
Figure 15:
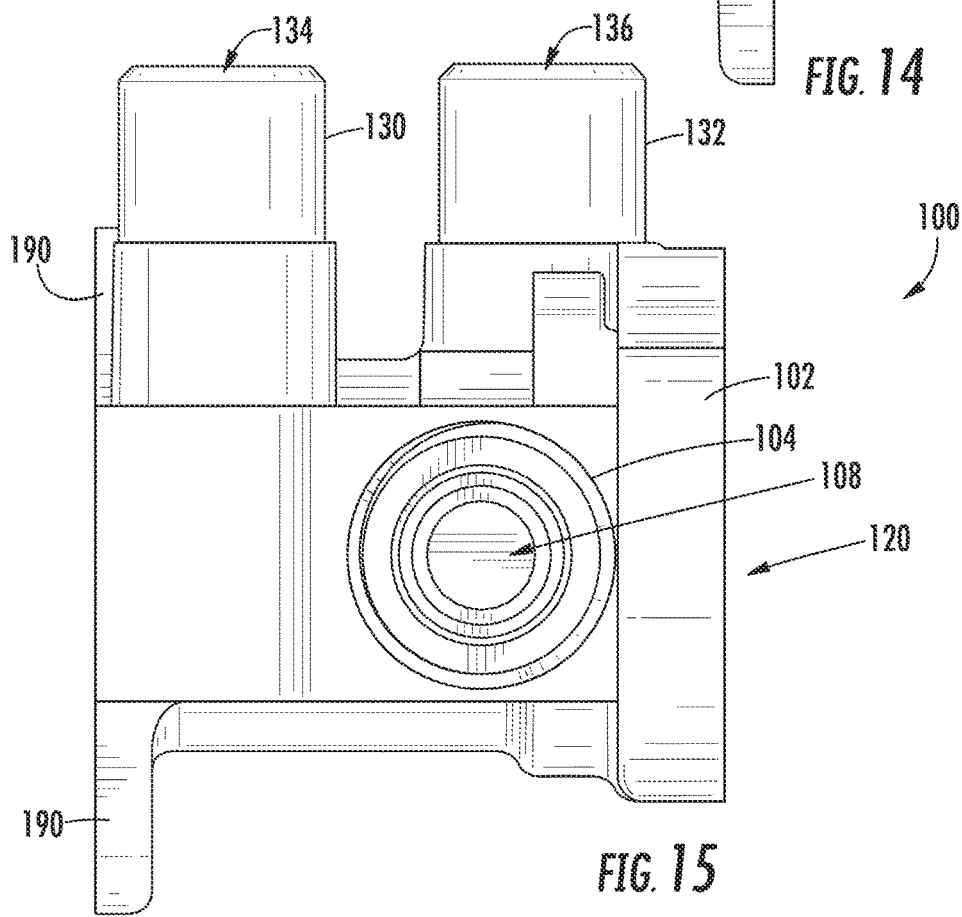
FIG. 15 is a left side view of the housing of FIG. 11.
Figure 16:
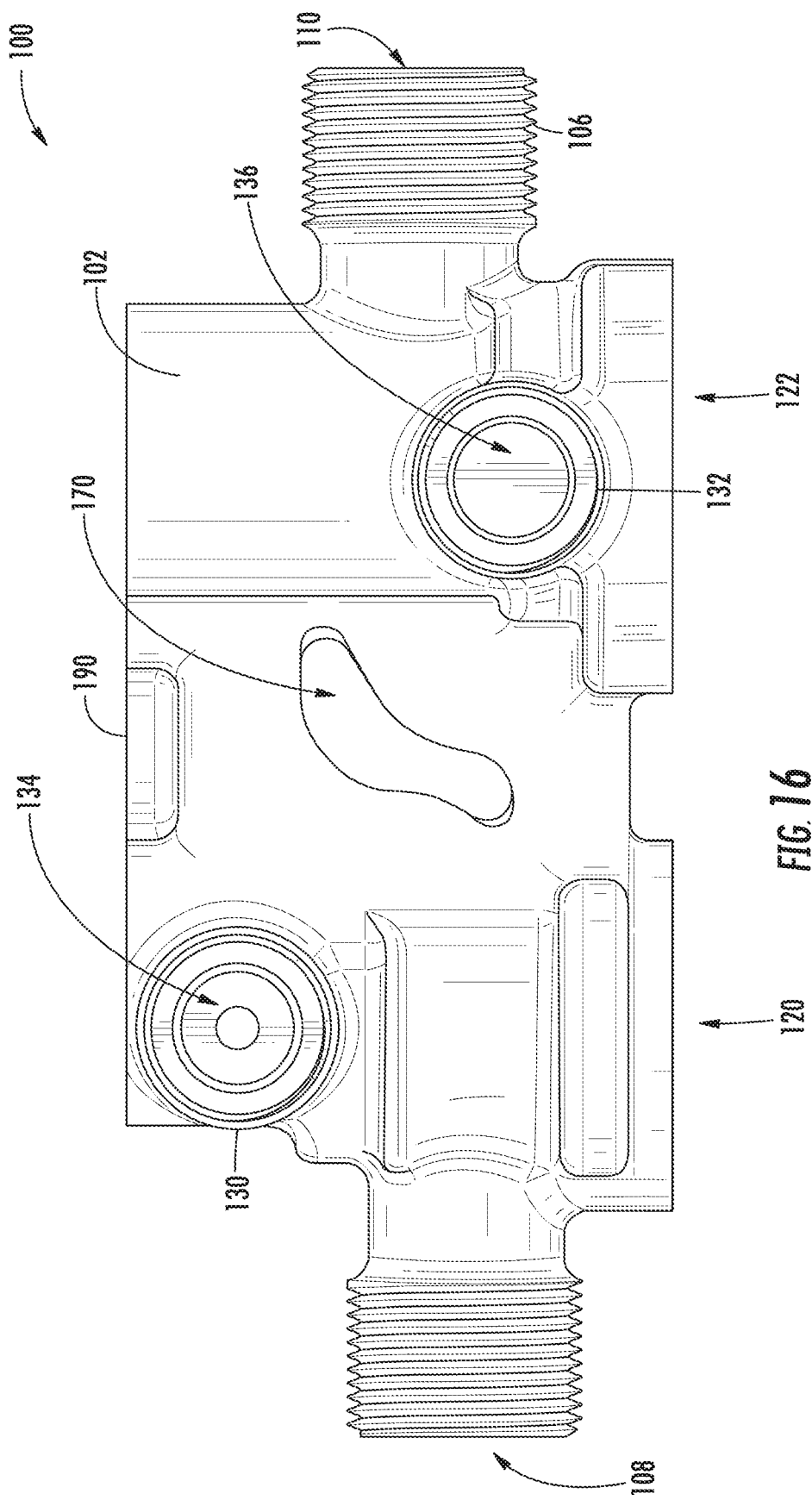
FIG. 16 is a top view of the housing of FIG. 11.
Figure 17:
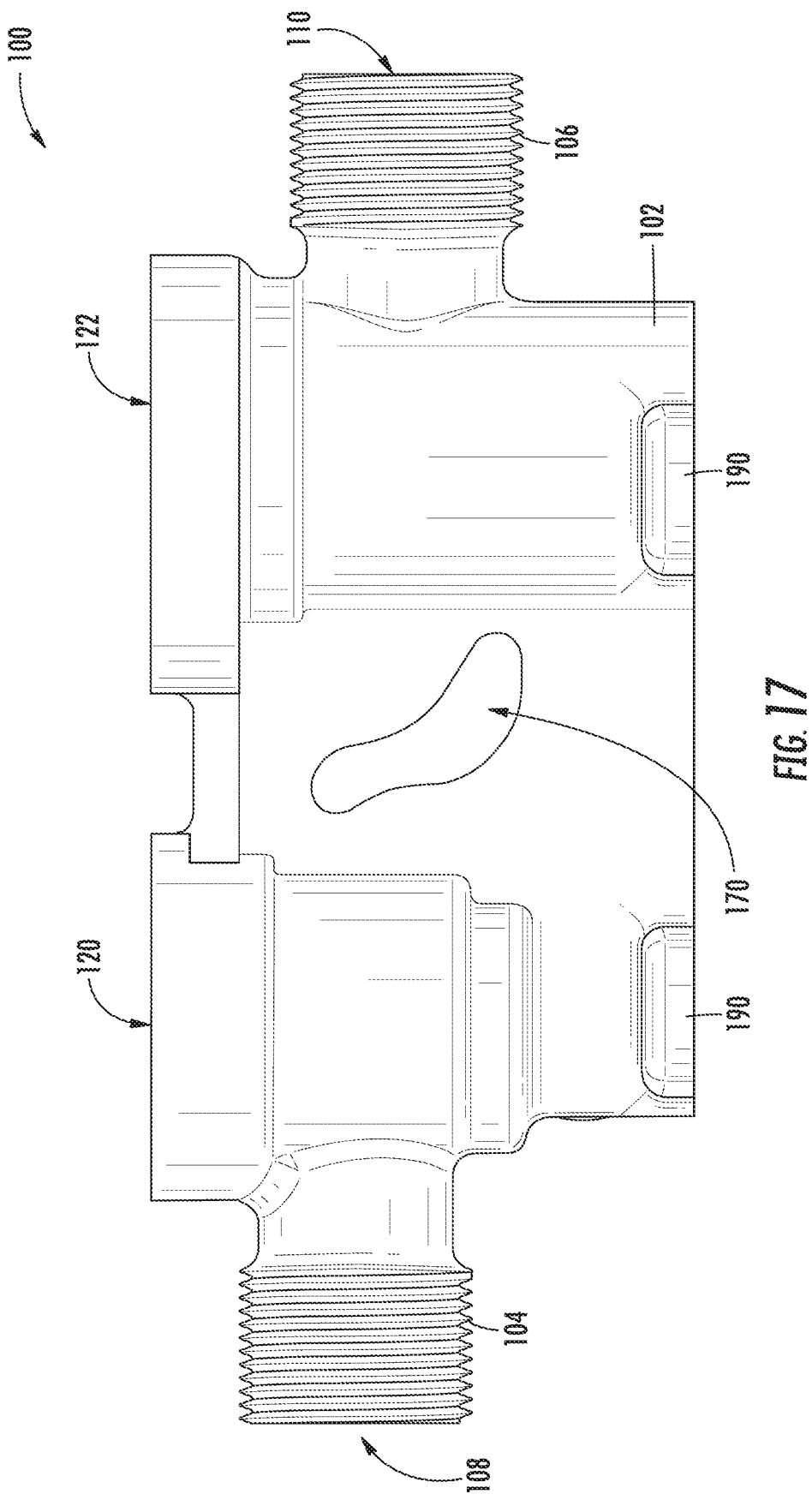
FIG. 17 is a bottom view of the housing of FIG. 11.

Referring to FIG. 8, the heat transfer barrier 170 is a component that replaces a section of the housing 100 and that defines a portion of the hot fluid passage 160 and/or the cold fluid passage 162. As shown, the housing 100 is formed in two separate sections that are each fixedly coupled (e.g., fastened, adhered, welded, brazed, etc.) to one side of the heat transfer barrier 170. The heat transfer barrier 170 is made from a material that is more resistant to heat transfer than a material used in one or both sections of the housing 100. In this embodiment, the material used in the heat transfer barrier 170 is solid such that the heat transfer barrier 170 provides a structural link between (e.g., fixedly and rigidly couples) the two sections of the housing 100.

The heat transfer barrier 170 may be made using a combination of any of the arrangements described herein.

By way of example, the heat transfer barrier 170 may be a component that defines a portion of the hot fluid passage 160, and that component may have an aperture extending therethrough that defines a void 172 fluidly coupled to the surrounding atmosphere. By way of another example, the housing 100 may define multiple voids 172, where at least one void 172 is filled with gas and at least one other void 172 is filled with a fluid. By way of yet another example, the heat transfer barrier 170 may be made from a pair of components arranged adjacent one another, where each component defines a portion of the hot fluid passage 160 and where each component is made from a different material. In any of these arrangements, the heat transfer barrier 170 may additionally or alternatively define a portion of the cold fluid passage 162.

Referring to FIGS. 9-17, the housing 100 further includes a number of protrusions, shown as mounting flanges 190. The mounting flanges 190 are integrally formed with the main body 102 of the housing 100 and extend outward from the main body 102 (e.g., upward, downward, etc.). Each mounting flange 190 extends substantially flush to a rear side of the main body 102, such that the housing 100 defines a continuous, substantially flat surface. Each mounting flange 190 defines an aperture, shown as mounting hole 192. The mounting flanges 190 are used to mount the valve assembly 10 to a surface, such as a wall beneath a sink. To install the valve assembly 10, the housing 100 may be placed against a surface (e.g., a wall, a beam, a floor, a ceiling, etc.), and fasteners may be extended through the mounting holes 192 and into the surface. The housing 100 may include more or fewer mounting flanges 190, or mounting flanges 190 in different locations. Alternatively, the mounting flanges 190 may be omitted, and the valve assembly 10 may be mounted using an alternative method.

Referring to FIG. 3, the valve assembly 10 further includes a pair of valves, shown as check valves 200. A first check valve 200 is disposed within the hot fluid inlet 108, and a second check valve 200 is disposed within the cold fluid inlet 110. The first check valve 200 is arranged to prevent fluid from passing out of the valve assembly 10 through the hot fluid inlet 108, and the second check valve 200 is arranged to prevent fluid from passing out of the valve assembly 10 through the cold fluid inlet 110. The check valves 200 may be fixed or removable. In some embodiments, the check valves 200 are omitted.

Referring to FIGS. 18-26, an alternative embodiment of the valve assembly 10 is shown as valve assembly 12. The valve assembly 12 may be substantially similar to the valve assembly 10 except as otherwise described herein. The valve assembly 12 includes a housing 300 configured to be coupled to the mixing valve 20 and the mixing valve 50. In some embodiments, the valve assembly 12 has the same performance characteristics as the valve assembly 10 (e.g., the same output temperature range, the same output flow rates, conforms to the same ASSE performance standards, etc.). In some embodiments, when the mixing valves 20 and 50 are operated individually at approximately 30 psi of pressure drop, the mixing valve 20 can provide approximately 3.7 GPM of fluid flow, and the mixing valve 50 can provide approximately 7.4 GPM of fluid flow. In some embodiments, both mixing valves, when operated together, can provide approximately 10 GPM of fluid flow total (e.g., 7 GPM through the mixing valve 50 and 3.2 GPM through the mixing valve 20, etc.).

Figure 26:
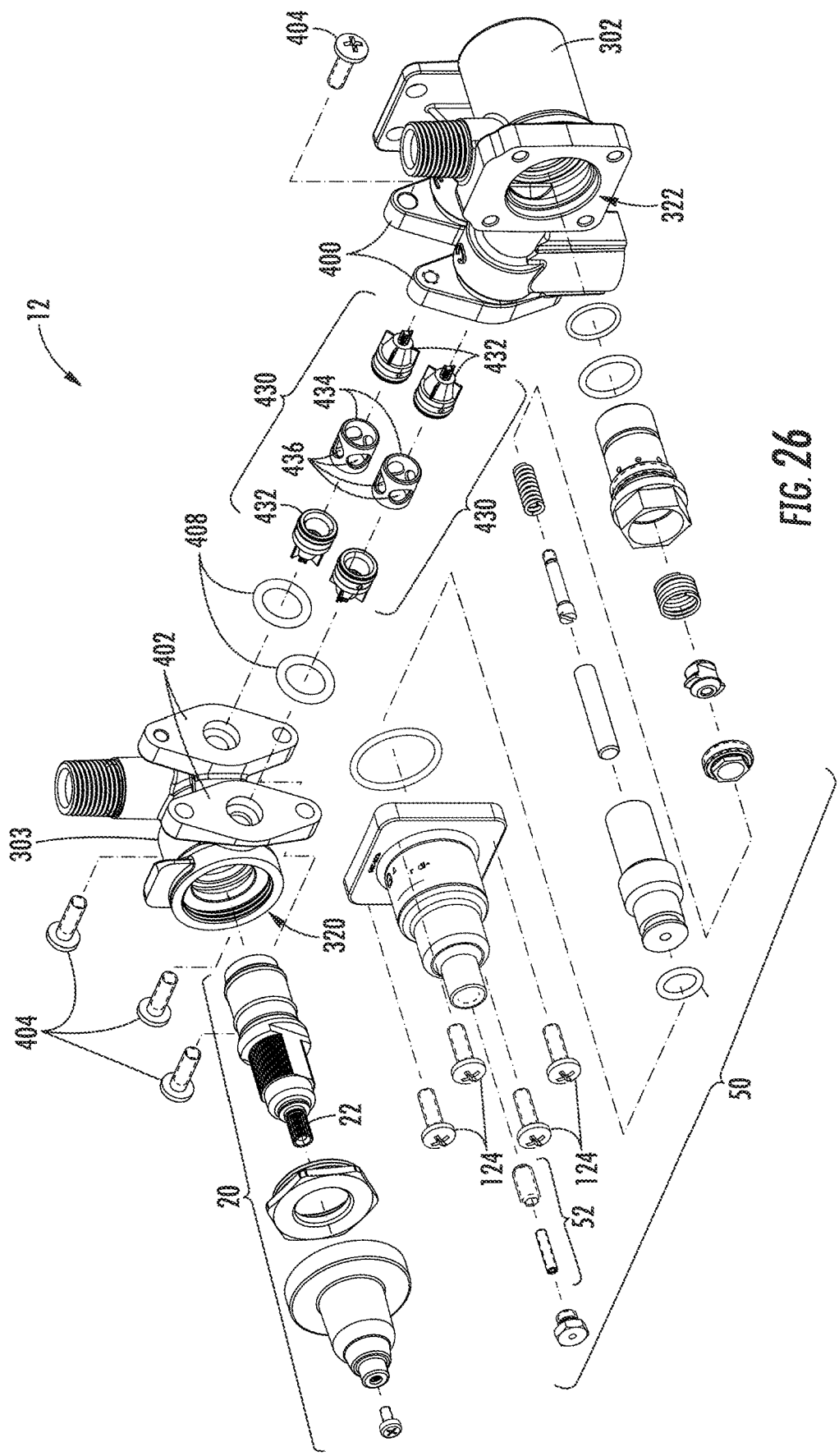
FIG. 26 is an exploded perspective view of the valve assembly of FIG. 19.

The housing 300 includes a first body portion, shown as body 302, and a second body portion, shown as body 303, which together make up a main body assembly of the housing 300. Forming the housing 300 from two separate pieces may facilitate manufacturing and assembly of the housing 300. The body 302 and the body 303 are selectively coupled to one another to form the housing 300. Specifically, the body 302 includes a first pair of bosses, shown as flanges 400, and the body 303 defines a second pair of bosses, shown as flanges 402. The flanges 400 and the flanges 402 each define a flat surface, and the flat surfaces of the flanges 400 abut the flat surfaces of the flanges 402 when the housing 300 is assembled. As shown, the flanges 400 are coupled to the flanges 402 by a series of fasteners 404. Specifically, the fasteners 404 each pass through an aperture defined by one of the flanges 400 or the flanges 402 and engage (e.g., thread into) another of the flanges 400 or the flanges 402 to couple the body 302 to the body 303. As shown in FIG. 26, a pair of seals, shown as o-rings 408, prevent leakage of fluid between the flanges 400 and the flanges 402.

Figure 21:
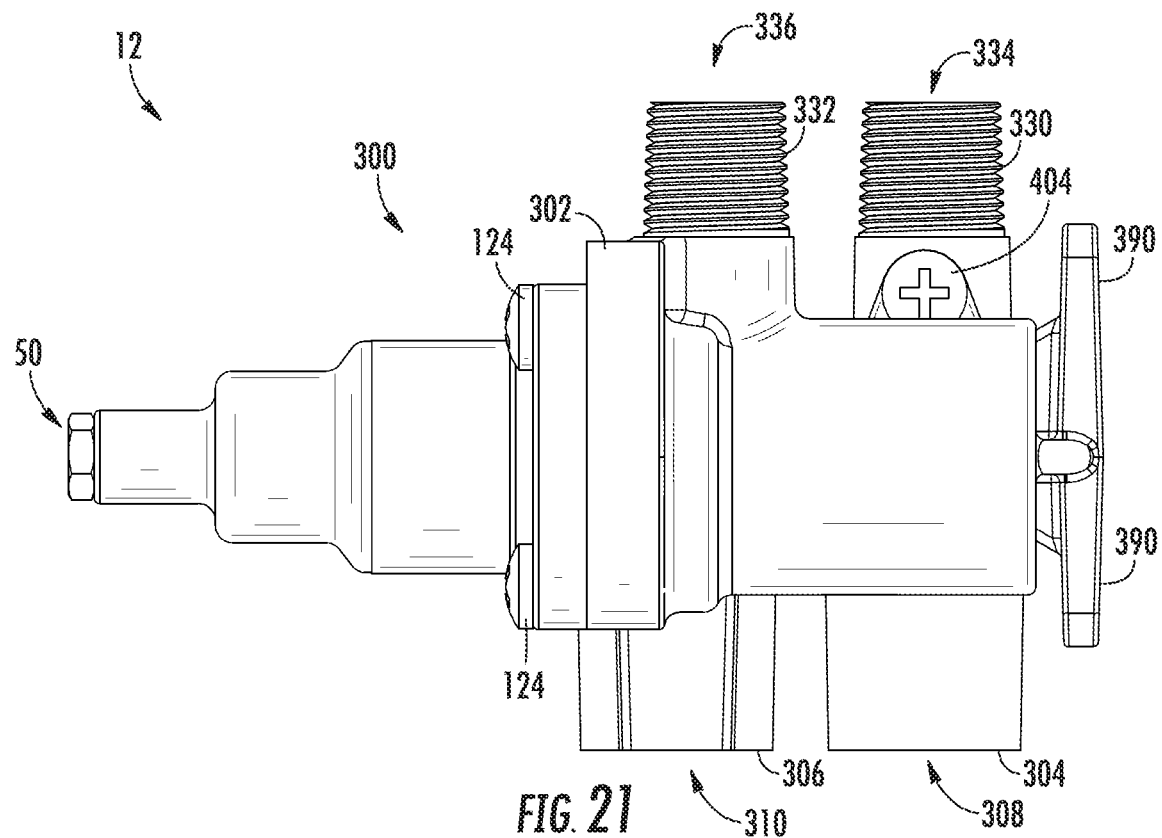
FIG. 21 is a right side view of the valve assembly of FIG. 18.
Figure 22:
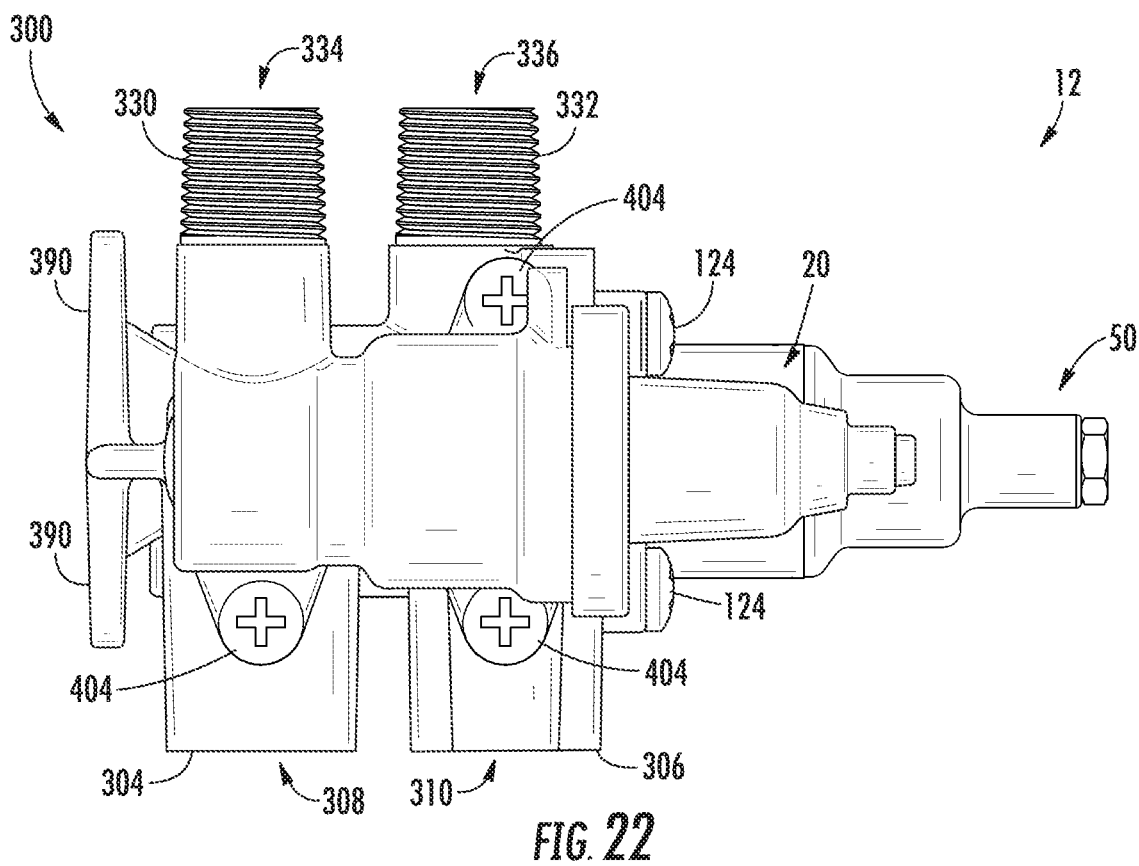
FIG. 22 is a left side view of the valve assembly of FIG. 18.
Figure 23:
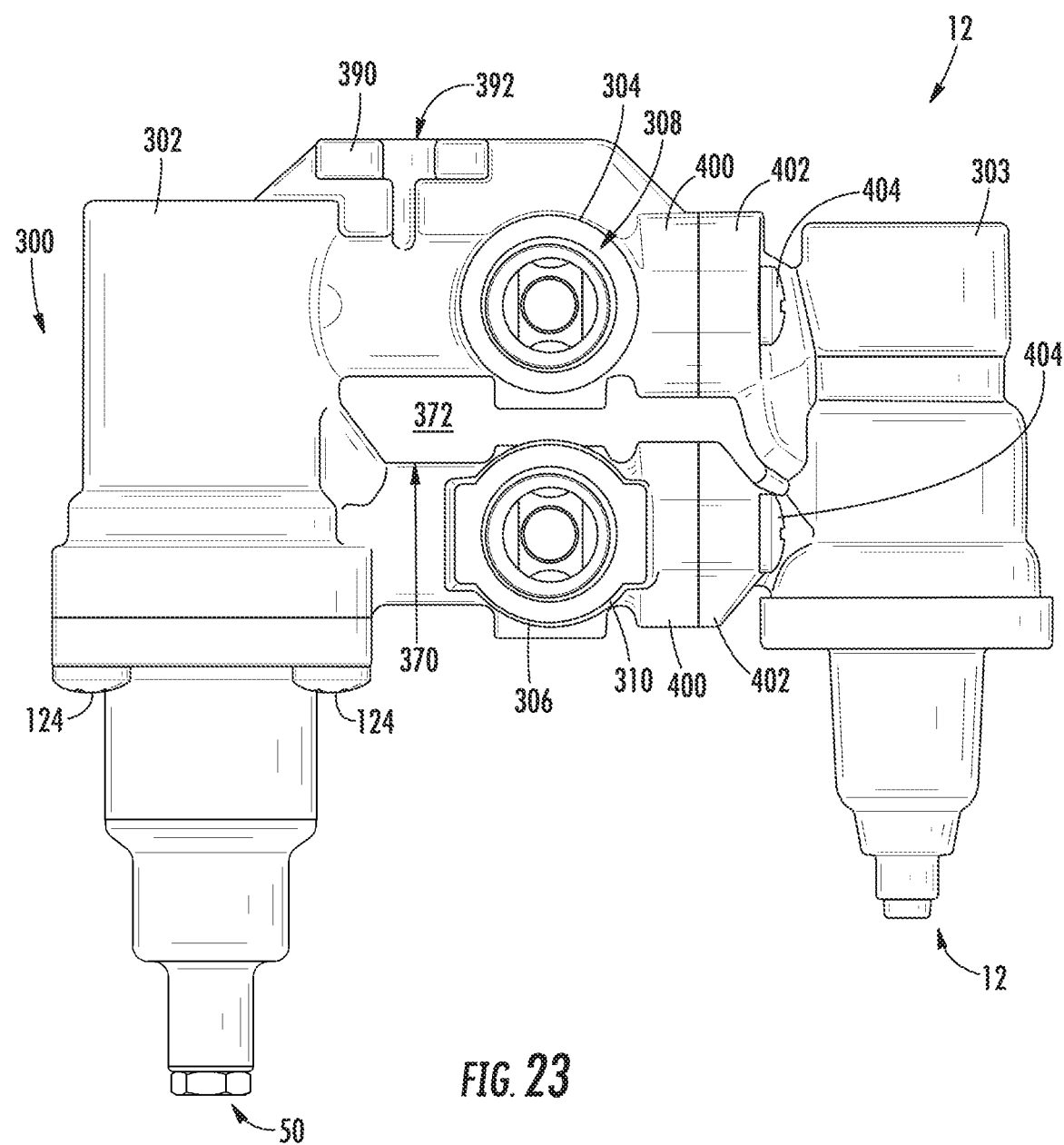
FIG. 23 is a bottom view of the valve assembly of FIG. 18.

Referring to FIGS. 21-23, the housing 300 includes a hot fluid fitting 304 and a cold fluid fitting 306, each extending vertically downward from the body 302 (e.g., substantially parallel to one another). The hot fluid fitting 304 defines a hot fluid inlet 308 configured to receive hot fluid from a hot fluid supply (a water heater, a hot water reservoir, etc.). The cold fluid fitting 306 defines a cold fluid inlet 310 configured to receive cold fluid from a cold fluid supply (e.g., a well, a cold water reservoir, a city water main, etc.). As shown, the hot fluid fitting 304 and the cold fluid fitting 306 each have a female thread to facilitate connection to the hot fluid supply and the cold fluid supply.

Figure 25:
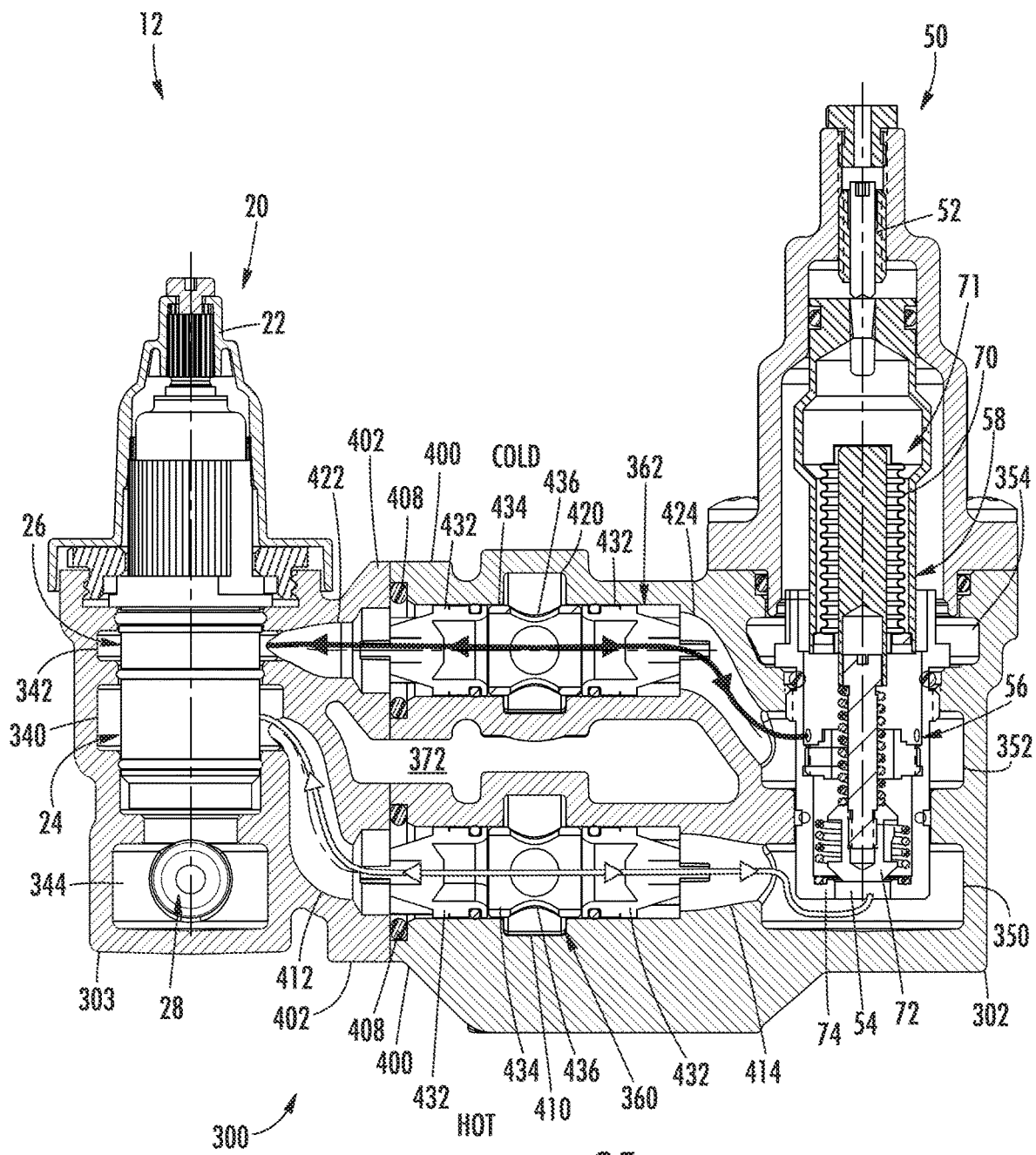
FIG. 25 is a bottom section view of the valve assembly of FIG. 18.

Referring to FIGS. 25 and 26, the body 303 defines a first valve recess 320, configured to receive the first mixing valve 20. The body 302 defines a second aperture, shown as second valve recess 322, configured to receive the second mixing valve 50. A portion of the first valve recess 320 is threaded to engage with a corresponding external thread on the first mixing valve 20. The second mixing valve 50 is fastened to the body 302 using fasteners 124. Alternatively, the first mixing valve 20 and the second mixing valve 50 may be fastened, adhered, pressed, welded, or otherwise coupled to the housing 300.

Figure 18:
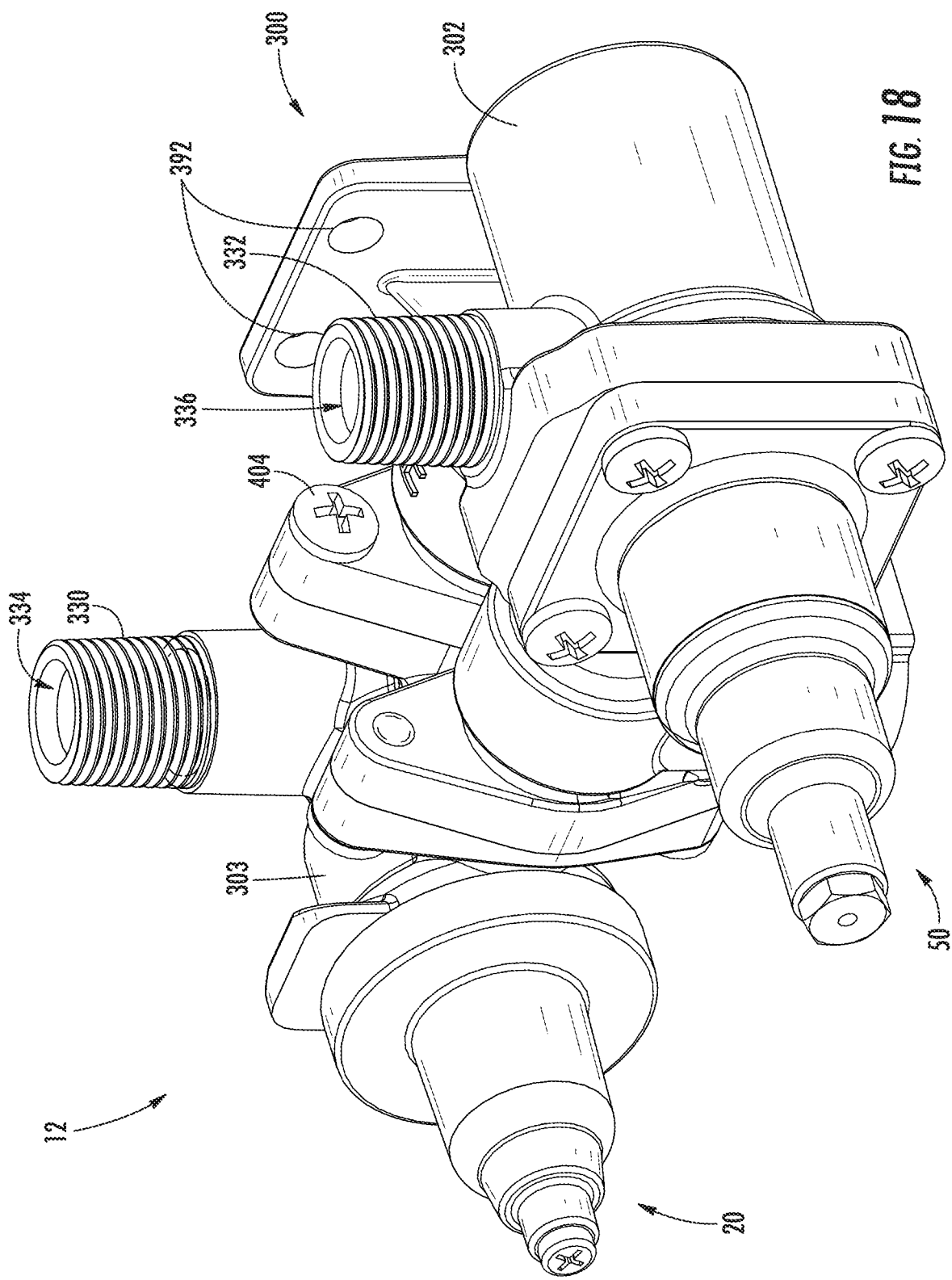
FIG. 18 is a perspective view of a valve assembly, according to another exemplary embodiment.
Figure 19:
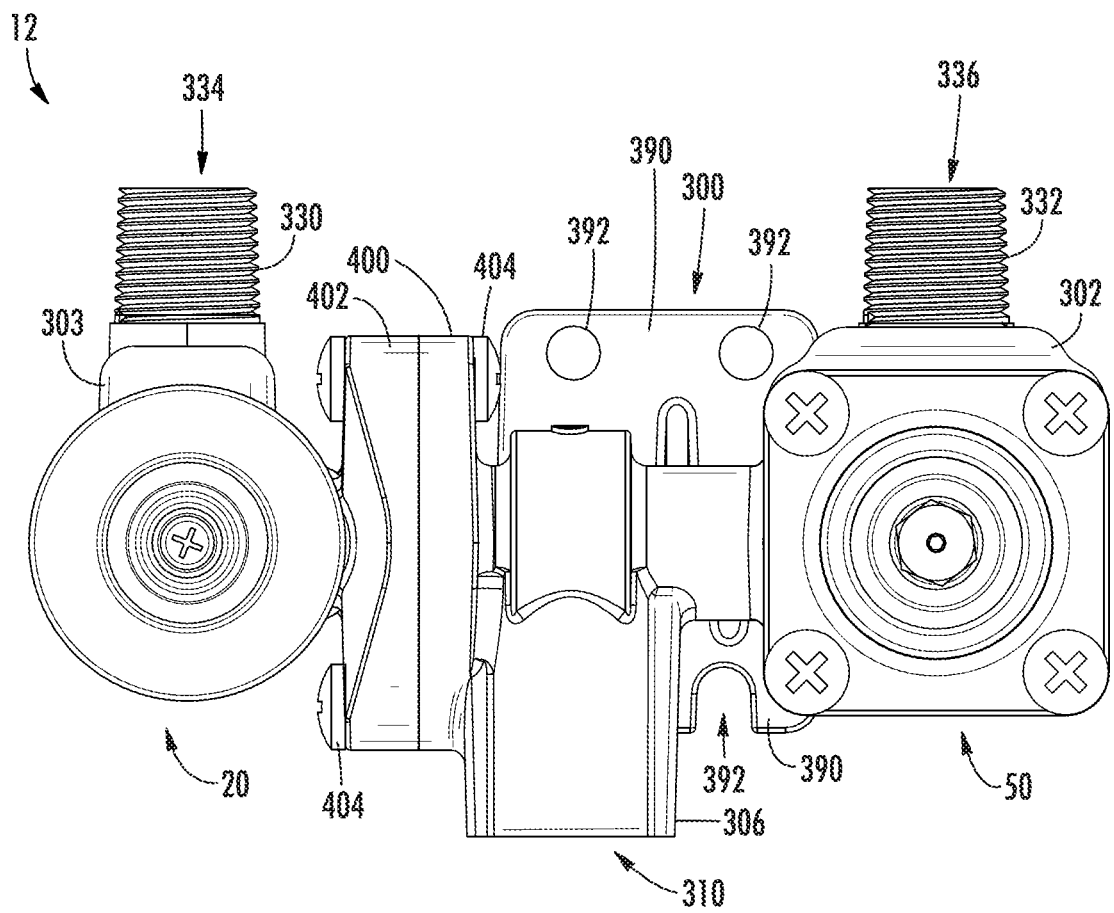
FIG. 19 is a front view of the valve assembly of FIG. 18.
Figure 20:
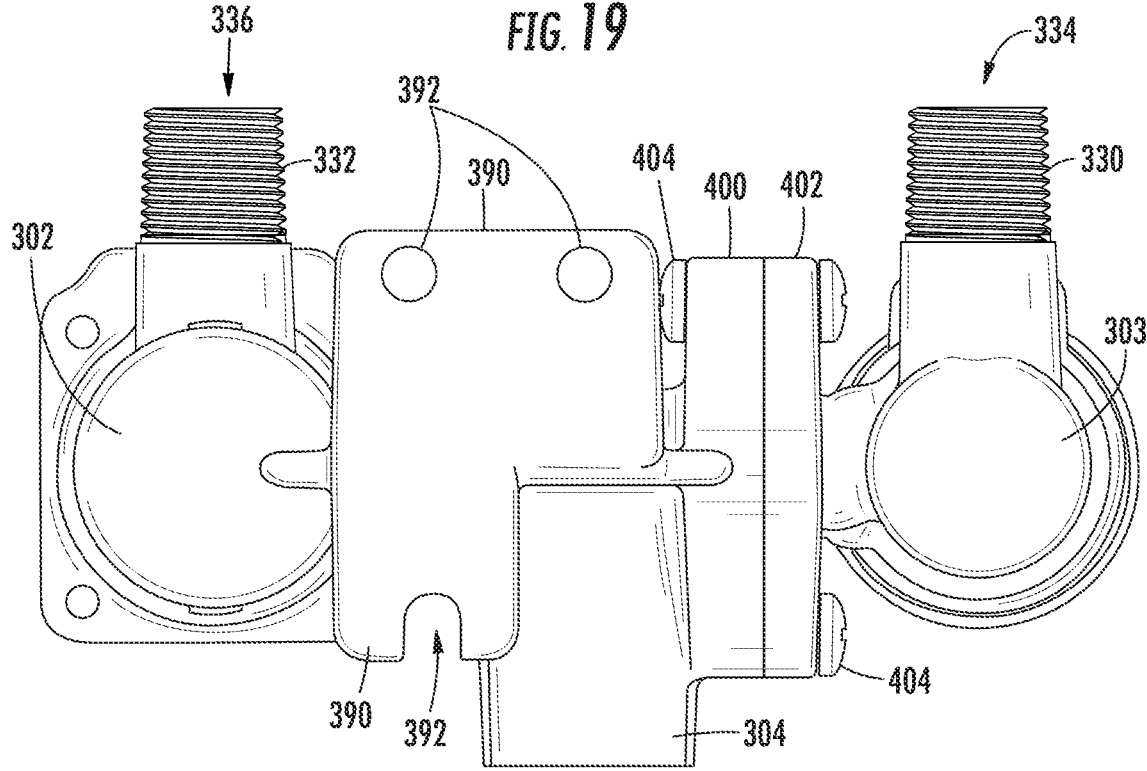
FIG. 20 is a rear view of the valve assembly of FIG. 18.

Referring to FIG. 18, the housing 300 includes an outlet fitting 330 extending vertically upward from the body 303. The housing 300 further includes an outlet fitting 332 extending vertically upward from the body 302 (e.g., substantially parallel to the outlet fitting 330, the hot fluid fitting 304, and/or the cold fluid fitting 306). The outlet fitting 330 defines a mixed fluid outlet 334 configured to receive mixed fluid from the first mixing valve 20. The outlet fitting 332 defines a mixed fluid outlet 336 configured to receive mixed fluid from the second mixing valve 50. The outlet fitting 330 and the outlet fitting 332 each include a male thread to facilitate connection to recipient devices (e.g., through a conduit such as a hose or pipe).

Referring to FIGS. 25 and 26, after the first mixing valve 20 is inserted into the first valve recess 320, the first mixing valve 20 seals against the housing 300 such that the housing 300 and the first mixing valve 20 cooperate to define a first hot fluid chamber 340, a first cold fluid chamber 342, and a first mixed fluid chamber 344 (e.g., the first mixing valve 20 seals against the housing 300 to divide the first valve recess 320 into multiple chambers). As shown, the first hot fluid chamber 340, the first cold fluid chamber 342, and the first mixed fluid chamber 344 are portions of the first valve recess 320. The first mixing valve 20 may include one or more O-rings or other varieties of seals to facilitate such sealing. The first hot fluid chamber 340 is fluidly coupled to the hot fluid inlet 24. The first cold fluid chamber 342 is fluidly coupled to the cold fluid inlet 26. The first mixed fluid chamber 344 is fluidly coupled to the mixed fluid outlet 28.

Referring again to FIGS. 25 and 26, after the second mixing valve 50 is inserted into the second valve recess 322, the second mixing valve 50 seals against the housing 300 such that the housing 300 and the second mixing valve 50 cooperate to define a second hot fluid chamber 350, a second cold fluid chamber 352, and a second mixed fluid chamber 354 (e.g., the second mixing valve 50 seals against the housing 300 to divide the second valve recess 322 into multiple chambers). As shown, the second hot fluid chamber 350, the second cold fluid chamber 352, and the second mixed fluid chamber 354 are portions of the second valve recess 322. The second mixing valve 50 may include one or more O-rings or other varieties of seals to facilitate such sealing. The second hot fluid chamber 350 is fluidly coupled to the hot fluid inlet 54. The second cold fluid chamber 352 is fluidly coupled to the cold fluid inlet 56. The second mixed fluid chamber 354 is fluidly coupled to the mixed fluid outlet 58.

Referring to FIGS. 25 and 27, the housing 300 defines a hot fluid passage 360 including a chamber, shown as hot fluid inlet chamber 410, a first passage, shown as first hot fluid connecting passage 412, and a second passage, shown as second hot fluid connecting passage 414. The hot fluid inlet chamber 410 is fluidly coupled to the hot fluid inlet 308. The first hot fluid connecting passage 412 extends between and fluidly couples the hot fluid inlet chamber 410 and the first hot fluid chamber 340. The second hot fluid connecting passage 414 extends between and fluidly couples the hot fluid inlet chamber 410 and the second hot fluid chamber 350. The hot fluid inlet chamber 410 is substantially laterally centered in the housing 300, and the first hot fluid connecting passage 412 and the second hot fluid connecting passage 414 extend laterally away from the hot fluid inlet chamber 410 in opposite directions. The hot fluid inlet chamber 410 and the second hot fluid connecting passage 414 are defined by the body 302. The first hot fluid connecting passage 412 is defined by both the body 302 and the body 303 and is sealed by one of the o-rings 408.

The housing 300 defines a cold fluid passage 362 including a chamber, shown as cold fluid inlet chamber 420, a first passage, shown as first cold fluid connecting passage 422, and a second passage, shown as second cold fluid connecting passage 424. The cold fluid inlet chamber 420 is fluidly coupled to the cold fluid inlet 310. The first cold fluid connecting passage 422 extends between and fluidly couples the cold fluid inlet chamber 420 and the first cold fluid chamber 342. The second cold fluid connecting passage 424 extends between and fluidly couples the cold fluid inlet chamber 420 and the second cold fluid chamber 352. The cold fluid inlet chamber 420 is substantially laterally centered in the housing 300, and the first cold fluid connecting passage 422 and the second cold fluid connecting passage 424 extend laterally away from the cold fluid inlet chamber 420 in opposite directions. As shown, the cold fluid inlet chamber 420 and the hot fluid inlet chamber 410 are substantially laterally aligned (e.g., at the same lateral position within the housing 300). The cold fluid inlet chamber 420 and the second cold fluid connecting passage 424 are defined by the body 302. The first cold fluid connecting passage 422 is defined by both the body 302 and the body 303 and is sealed by one of the o-rings 408.

As shown in FIGS. 25 and 27, the hot fluid inlet 308 is positioned substantially perpendicular to the first hot fluid connecting passage 412 and the second hot fluid connecting passage 414. As such, hot fluid is received within the hot fluid inlet chamber 410 and dispersed substantially perpendicular to the hot fluid inlet 308, such that the hot fluid passage 360 forms a T shape for distribution of hot fluid. Similarly, the cold fluid inlet 310 is positioned substantially perpendicular to the first cold fluid connecting passage 422 and the second cold fluid connecting passage 424. As such, cold fluid is received within the cold fluid inlet chamber 420 and dispersed substantially perpendicular to the cold fluid inlet 310, such that the cold fluid passage 362 forms a T shape for distribution of cold fluid. In other embodiments, these passages are not perpendicular to one another (e.g., such that they form a Y shape, such that they form an arrow shape, etc.). The relative orientations of the passages may be configured to facilitate ease of connection to other components (e.g., the hot fluid supply and the cold fluid supply). The hot fluid inlet 308 and the cold fluid inlet 310 may extend substantially parallel to one another. Similarly, the first hot fluid connecting passage 412, the second hot fluid connecting passage 414, the first cold fluid connecting passage 422, and the second cold fluid connecting passage 424 may extend substantially parallel to one another (e.g., at least near the hot fluid inlet passage 410 and the cold fluid inlet passage 420).

In some embodiments, a diverter (e.g., a wedge, a scoop, etc.) may be included in the hot fluid inlet chamber 410 and/or the cold fluid inlet chamber 420 to facilitate directing the fluid laterally from corresponding inlet. However, as shown the hot fluid inlet chamber 410 and the cold fluid inlet chamber 420 each have a larger cross-sectional area or diameter than the corresponding connecting passages to facilitate building up fluid within the inlet chamber. This may facilitate the fluid changing direction (e.g., as it travels along the T-shaped passage) and facilitate reduction of turbulence within the fluid.

Referring to FIGS. 25-27, the valve assembly 12 further includes a pair of check valve assemblies 430, one positioned within each of the hot fluid passage 360 and the cold fluid passage 362. Each check valve assembly 430 includes a pair of valves, shown as check valves 432 (i.e., two check valves are disposed within the hot fluid passage 360 and two check valves are disposed within the cold fluid passage 362). The check valves 432 are positioned on opposite sides of the respective fluid inlet chamber (e.g., the hot fluid inlet chamber 410 or the cold fluid inlet chamber 420). The check valves 432 are configured to permit fluid to pass out of the fluid inlet chamber through the check valve 432, but prevent fluid from passing back toward the fluid inlet chamber through the check valve 432. By way of example, the check valve 432 in the second cold fluid connecting passage 424 permits cold fluid to pass freely from the cold fluid inlet chamber 420 to the second cold fluid chamber 352, but this check valve 432 prevents fluid (e.g., cold fluid, mixed fluid, etc.) to pass from the second cold fluid chamber 352 back to the cold fluid inlet chamber 420. Accordingly, the check valves 432 of each check valve assembly 430 permit flow in opposite directions. The check valves 432 prevent the mixing of fluid in undesirable ways (e.g., mixed fluid passing from the second mixing valve 50 to the cold water supply or to the first mixing valve 20, etc.).

During assembly of the valve assembly 12, each check valve assembly 430 may be inserted into the hot fluid passage 360 or the cold fluid passage 362 prior to coupling the body 302 to the body 303. One of the check valves 432 is prevented from moving laterally outward (e.g., from the hot fluid inlet chamber 410 or the cold fluid inlet chamber 420) by engagement with a step formed in the second hot fluid connecting passage 414 or the second cold fluid connecting passage 424. The other check valve 432 is prevented from moving laterally outward by engagement with one of the flanges 402. To prevent the check valves 432 from moving laterally toward one another (e.g., into the hot fluid inlet chamber 410), each valve assembly 430 includes a cylindrical, annular, or tubular spacer, shown as spacer 434. In other words, the spacer 434 is configured to prevent, at least partially, movement of the check valves after insertion into the fluid passages (i.e., keep them in place). The spacer 434 is positioned within the respective fluid inlet chamber between the check valves 432 (one spacer for the hot fluid passage and one spacer for the cold fluid passage; in other embodiments, more than spacer may be utilized). As shown in FIG. 27, the fluid inlet chambers each surround the respective spacers 434. The spacers 434 are tubular to facilitate fluid flow there through. A wall of each spacer 434 defines a series of apertures, shown as spacer apertures 436 that extend radially outward through the wall. The spacer apertures 436 facilitate fluid flow from the fluid inlet chambers through the corresponding spacer 434. Because the fluid inlet chambers surround each spacer 434, the rotational orientation of the spacer 434 does not affect the flow rate of fluid through the valve assembly 12, simplifying the assembly process.

In other embodiments, the spacers 434 are omitted, and the housing 300 defines a shoulder that limits lateral movement of the spacers 434. In still other embodiments, a component is coupled to the housing 300 and limits lateral movement of the spacers 434. By way of example, the housing 300 may define one or more snap ring grooves configured to receive snap rings, and the snap rings may engage the spacers 434 to limit lateral movement of the spacers 434.

During operation, hot fluid passes from the hot fluid inlet 308 to the first mixing valve 20 and the second mixing valve 50 simultaneously along a hot fluid flow path. The hot fluid flow path is illustrated as a white arrow in FIG. 25. Hot fluid enters through the hot fluid inlet 308 and passes into the hot fluid inlet chamber 410 and through the spacer apertures 436. The hot fluid is divided within the hot fluid inlet chamber 410. A first portion of the hot fluid passes through a check valve 432 along the first hot fluid connecting passage 412 to the first hot fluid chamber 340. This hot fluid can then enter the first mixing valve 20 through the hot fluid inlet 24. A second portion of the hot fluid passes through a check valve 432 along the second hot fluid connecting passage 414 to the second hot fluid chamber 350. This hot fluid can then enter the second mixing valve 50 through the hot fluid inlet 54. Accordingly, both the first mixing valve 20 and the second mixing valve 50 are fluidly coupled to the hot water supply through the hot water flow path.

Similarly, during operation, cold fluid passes from the cold fluid inlet 310 to the first mixing valve 20 and the second mixing valve 50 simultaneously along a cold fluid flow path. The cold fluid flow path is illustrated as a black arrow in FIG. 25. Cold fluid enters through the cold fluid inlet 310 and passes into the cold fluid inlet chamber 420 and through the spacer apertures 436. The cold fluid is divided within the cold fluid inlet chamber 420. A first portion of the cold fluid passes through a check valve 432 along the first cold fluid connecting passage 422 to the first cold fluid chamber 342. This cold fluid can then enter the first mixing valve 20 through the cold fluid inlet 26. A second portion of the cold fluid passes through a check valve 432 along the second cold fluid connecting passage 424 to the second cold fluid chamber 352. This cold fluid can then enter the second mixing valve 50 through the cold fluid inlet 56. Accordingly, both the first mixing valve 20 and the second mixing valve 50 are fluidly coupled to the cold water supply through the cold water flow path.

Figure 24:
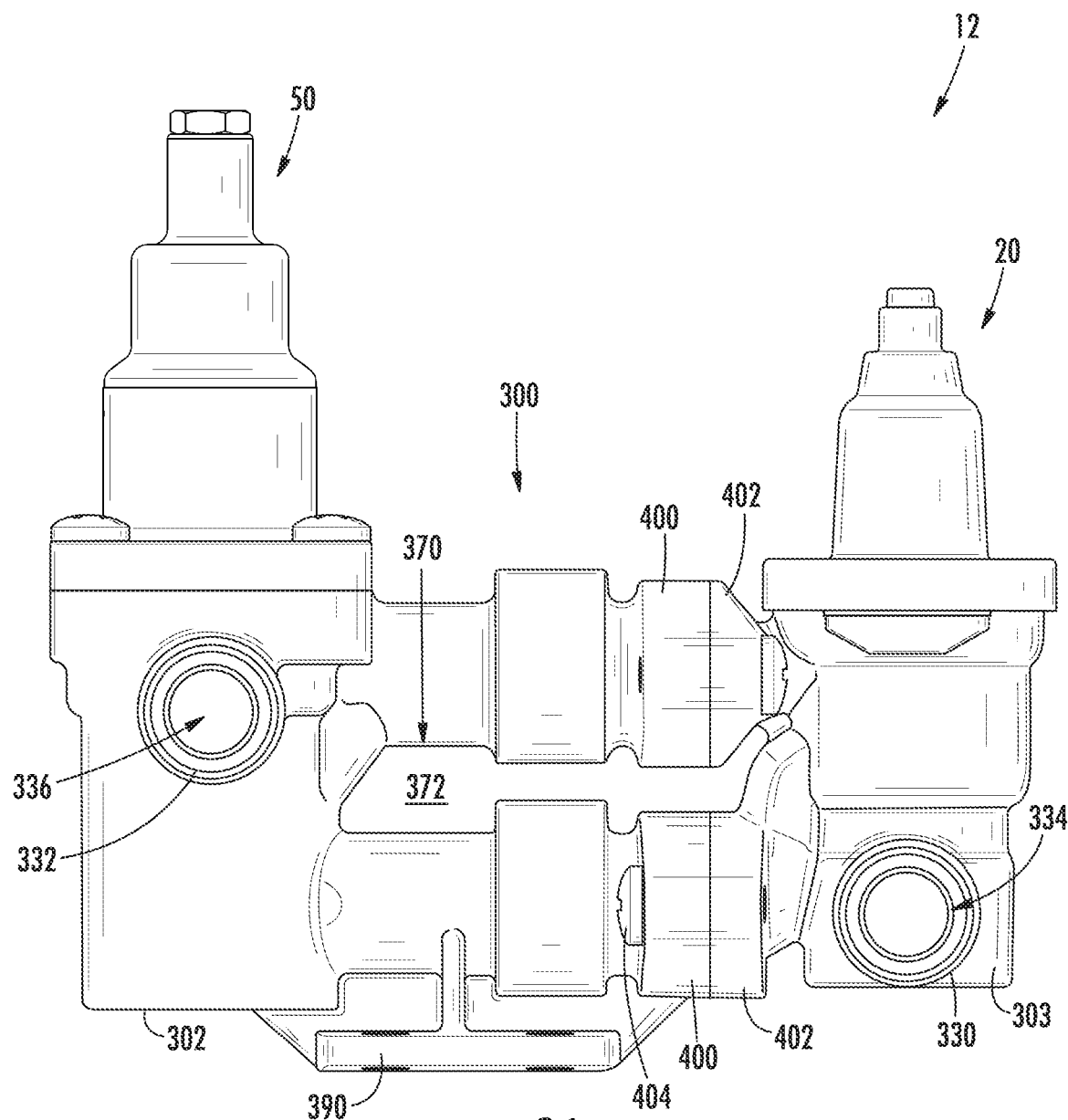
FIG. 24 is a top view of the valve assembly of FIG. 18.

Referring to FIGS. 23, 24, and 27, the housing 300 defines a heat transfer barrier 370. Specifically, as shown, the heat transfer barrier 370 is a void 372 (e.g., opening, aperture, hole, etc.) that extends through the entirety of the housing 300 (e.g., from a top surface to a bottom surface, from a first exterior surface to a second exterior surface, etc.). As shown, the void 372 is defined by both the body 302 and the body 303. The void 372 extends from adjacent the first mixing valve 20 to adjacent the second mixing valve 50, along a majority (e.g., almost the entirety) of the length the hot fluid passage 360 and the cold fluid passage 362. The void 372 is fluidly coupled to the surrounding atmosphere and fills with gas (e.g., an air gap) from the surrounding atmosphere from multiple sides of the housing 300. This gas insulates the hot fluid passage 360 from the cold fluid passage 362, reducing heat transfer between the hot fluid and the cold fluid. The cross-sectional area of the void 372 varies as the void 372 extends vertically, laterally, and longitudinally due to the shape of the housing 300. In other embodiments, the void 372 is filled partially or entirely with a solid or liquid material that is a worse conductor of heat than the material of the housing 300 (e.g., as described with respect to FIG. 7). In other embodiments, a portion of the housing 300 is replaced with a different material that resists heat transfer (e.g., as described with respect to FIG. 8).

Referring to FIGS. 18-24, the housing 300 further includes a series of protrusions, shown as mounting flanges 390. The mounting flanges 390 are integrally formed with the body 302 and extend upward and downward from the body 302. Each mounting flange 390 extends substantially flush to a rear side of the body 302, such that the housing 300 defines a continuous, substantially flat surface. The mounting flanges 390 define apertures, slots, or recesses, shown as mounting holes 392. The mounting flanges 390 are used to mount the valve assembly 12 to a surface, such as a wall beneath a sink. The vertical orientations of the hot fluid fitting 304, the cold fluid fitting 306, the outlet fitting 330, and the outlet fitting 332 may facilitate a clean conduit layout when the valve assembly 12 is installed. By way of example, the hot water supply and the cold water supply can be connected extending downward from the valve assembly 12, and the mixed water conduits can extend upward from the valve assembly 12, all extending substantially parallel to one another.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the valve assembly as shown in the various exemplary embodiments is illustrative only. Additionally, any element disclosed in one embodiment may be incorporated or utilized with any other embodiment disclosed herein. For example, the heat transfer barrier 170 of the exemplary embodiment shown in at least FIG. 8 may be incorporated in the valve assembly 12 of the exemplary embodiment shown in at least FIG. 18. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A valve assembly, comprising:
    a first mixing valve configured to mix hot fluid and cold fluid to provide a first mixed fluid;
    a second mixing valve configured to mix hot fluid and cold fluid to provide a second mixed fluid;
    a housing configured to receive the first mixing valve and the second mixing valve, the housing defining:
        a hot fluid inlet configured to be fluidly coupled to a supply of hot fluid;
        a cold fluid inlet configured to be fluidly coupled to a supply of cold fluid;
        a hot fluid passage comprising:
            a hot fluid inlet chamber fluidly coupled to the hot fluid inlet;
            a first hot fluid connecting passage fluidly coupling the hot fluid inlet chamber to the first mixing valve; and
            a second hot fluid connecting passage fluidly coupling the hot fluid inlet chamber to the second mixing valve; and
        a cold fluid passage fluidly coupling the cold fluid inlet to the first mixing valve and the second mixing valve; and
    a first check valve and a second check valve coupled to the housing,
    wherein the first check valve is positioned within the first hot fluid connecting passage and configured to prevent fluid from flowing from the first mixing valve to the hot fluid inlet chamber, and wherein the second check valve is positioned within the second hot fluid connecting passage and configured to prevent fluid from flowing from the second mixing valve to the hot fluid inlet chamber.

2. The valve assembly of claim 1, further comprising a third check valve coupled to the housing and positioned along the cold fluid passage, wherein the third check valve is configured to prevent fluid from flowing through the cold fluid passage from the first mixing valve to the second mixing valve.

3. The valve assembly of claim 1, wherein the housing defines a heat transfer barrier passage extending therethrough, wherein the heat transfer barrier passage extends between the hot fluid inlet chamber and the cold fluid passage.

4. The valve assembly of claim 1, further comprising a spacer extending between the first check valve and the second check valve and configured to limit movement of the first check valve toward the second check valve.

5. The valve assembly of claim 1, wherein the housing further defines a valve recess that receives the first mixing valve, wherein the first mixing valve seals against the housing to divide the valve recess into a hot fluid chamber and a cold fluid chamber, wherein the hot fluid chamber is fluidly coupled to the hot fluid passage, and wherein the cold fluid chamber is fluidly coupled to the cold fluid passage.

6. The valve assembly of claim 5, wherein the first mixing valve seals against the housing to divide the valve recess into the hot fluid chamber, the cold fluid chamber, and a mixed fluid chamber, wherein the mixed fluid chamber is configured to receive the first mixed fluid from the first mixing valve.

7. The valve assembly of claim 1, wherein the housing further defines a first mixed fluid outlet fluidly coupled to the first mixing valve and a second mixed fluid outlet fluidly coupled to the second mixing valve, wherein the housing is configured such that the first mixed fluid passes out of the housing through the first mixed fluid outlet, and wherein the housing is configured such that the second mixed fluid passes out of the housing through the second mixed fluid outlet.

8. The valve assembly of claim 1, wherein the housing defines only one hot fluid inlet fluidly coupled to the hot fluid passage and only one cold fluid inlet fluidly coupled to the cold fluid passage.

9. The valve assembly of claim 1, wherein the housing defines a heat transfer barrier passage extending from a first exterior surface of the housing to a second exterior surface of the housing, and wherein the heat transfer barrier passage extends at least partially between the hot fluid passage and the cold fluid passage.

10. A housing for a valve assembly, the housing defining:
a first valve recess configured to receive a first mixing valve;
a second valve recess configured to receive a second mixing valve;
a hot fluid inlet configured to be fluidly coupled to a supply of hot fluid;
a cold fluid inlet configured to be fluidly coupled to a supply of cold fluid;
a hot fluid passage fluidly coupling the hot fluid inlet to each of the first valve recess and the second valve recess; and
a cold fluid passage fluidly coupling the cold fluid inlet to each of the first valve recess and the second valve recess,
wherein the housing includes a heat transfer barrier extending between the hot fluid passage and the cold fluid passage and configured to resist heat transfer between the hot fluid passage and the cold fluid passage; and
wherein the heat transfer barrier includes a first material, wherein the housing includes a second material, and wherein the second material of the housing is more thermally conductive than the first material of the heat transfer barrier.

11. A valve assembly, comprising:
a first mixing valve configured to mix hot fluid and cold fluid to provide a first mixed fluid, the first mixing valve extending along a first longitudinal axis;
a second mixing valve configured to mix hot fluid and cold fluid to provide a second mixed fluid, the second mixing valve extending along a second longitudinal axis; and
a housing configured to receive the first mixing valve and the second mixing valve, the housing defining:
a hot fluid inlet configured to be fluidly coupled to a hot fluid supply;
a cold fluid inlet configured to be fluidly coupled to a cold fluid supply;
a hot fluid passage fluidly coupling the hot fluid inlet to the first mixing valve and the second mixing valve; and
a cold fluid passage fluidly coupling the cold fluid inlet to the first mixing valve and the second mixing valve;
wherein the first longitudinal axis is offset from the second longitudinal axis.

12. The valve assembly of claim 11, wherein a first portion of the first mixing valve and a second portion of the second mixing valve extend away from the housing in the same direction.

13. The valve assembly of claim 11, wherein the housing defines a void extending at least partially between the hot fluid passage and the cold fluid passage.

14. The valve assembly of claim 13, wherein the void extends from a first exterior surface of the housing to a second exterior surface of the housing such that air from the surrounding atmosphere is permitted to pass through the void.

15. The valve assembly of claim 11, further comprising a heat transfer barrier extending between the hot fluid passage and the cold fluid passage, wherein the heat transfer barrier includes a first material, wherein the housing includes a second material, and wherein the second material of the housing is more thermally conductive than the first material of the heat transfer barrier.

* * * * *